United States Patent
Sato

(10) Patent No.: US 6,452,604 B1
(45) Date of Patent: Sep. 17, 2002

(54) INTERFERENCE CHECKING APPARATUS AND METHOD FOR CHECKING INTERFERENCE OF OBJECTS IN COMPUTER

(75) Inventor: Yuichi Sato, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/270,504

(22) Filed: Mar. 17, 1999

(30) Foreign Application Priority Data

May 12, 1998 (JP) .......................................... 10-128007

(51) Int. Cl.⁷ .............................................. G06T 11/00
(52) U.S. Cl. ...................................... 345/619; 345/620
(58) Field of Search ................................ 345/422, 958, 345/619, 620, 621; 700/255, 301

(56) References Cited

U.S. PATENT DOCUMENTS

| | | |
|---|---|---|
| 4,578,757 A | 3/1986 | Stark |
| 4,888,707 A * | 12/1989 | Shimada ..................... 700/255 |
| 4,922,430 A | 5/1990 | Wavish |
| 5,047,916 A | 9/1991 | Kondo |
| 5,056,031 A * | 10/1991 | Nakano et al. ............. 700/255 |
| 5,150,452 A | 9/1992 | Pollack et al. |
| 5,347,459 A | 9/1994 | Greenspan et al. |
| 5,497,453 A * | 3/1996 | Megahed et al. ........... 345/422 |
| 5,675,720 A * | 10/1997 | Sato et al. .................. 345/419 |

FOREIGN PATENT DOCUMENTS

| | | |
|---|---|---|
| JP | A-2-5499 | 1/1990 |
| JP | A-6-83422 | 3/1994 |
| JP | A-6-259506 | 9/1994 |
| JP | A-7-100733 | 4/1995 |
| JP | A-8-63492 | 3/1996 |

OTHER PUBLICATIONS

E.G. Gilbert, et al., "A Fast Procedure for Computing the Distance Between Complex Objects in Three–Dimensional Space," IEEE Journal of Robotics and Automation, vol. 4, No. 2, (Apr. 1988), pp. 193–203.

* cited by examiner

Primary Examiner—Matthew Luu
(74) Attorney, Agent, or Firm—Staas & Halsey LLP

(57) ABSTRACT

An interference checking apparatus approximates the shape of an object with an envelope figure, such as a rectangular parallelepiped, a sphere, etc., and checks static interference among many objects at high speed. In this static interference check, an approximate figure is projected into a space of a lower dimension, pairs of objects with a possibility of interference are focused on in stages, and the number of the pairs is reduced. Then, a precise interference check is performed for the remaining pairs.

18 Claims, 21 Drawing Sheets

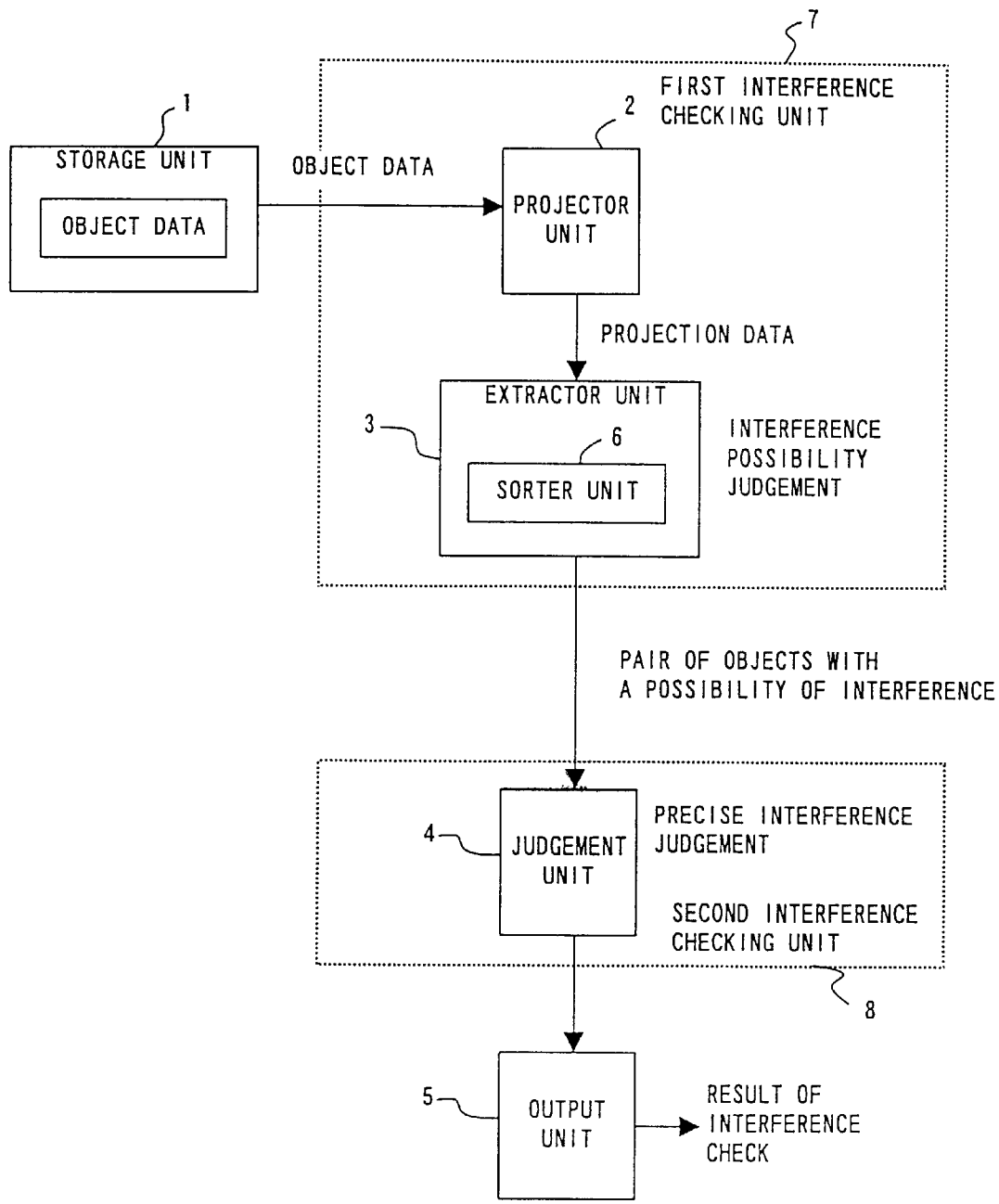
F I G. 1

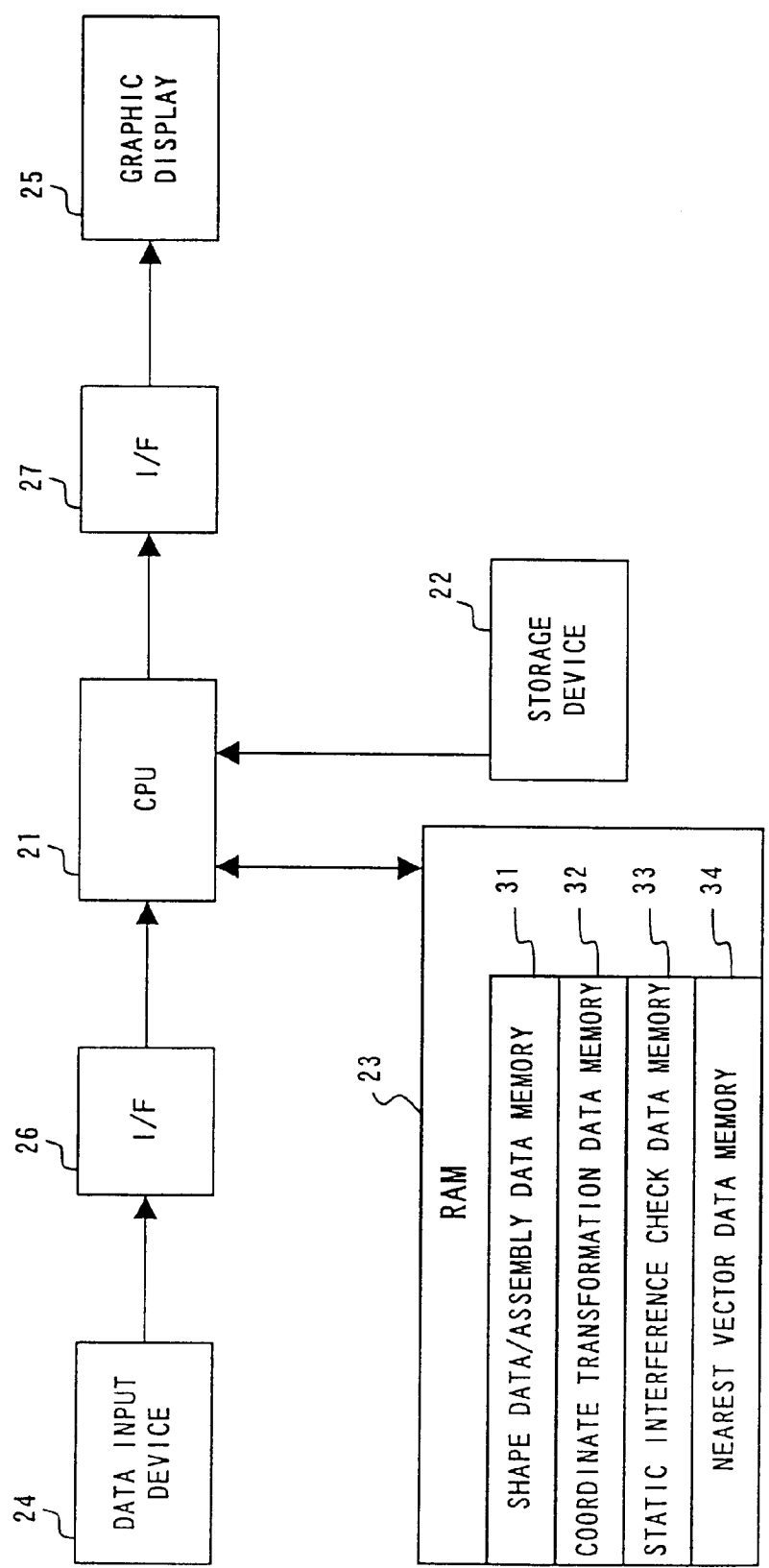
F I G. 3

| COMPONENT A, P1 |
|---|
| COMPONENT A, P2 |
| COMPONENT A, P3 |
| COMPONENT B, P1 |
| COMPONENT B, P2 |
| COMPONENT B, P3 |
| COMPONENT C, P4 |
| ⋮ |

FIG. 13

INTERFERENCE CHECKING APPARATUS AND METHOD FOR CHECKING INTERFERENCE OF OBJECTS IN COMPUTER

BACKGROUND OF THE INVENTION

1. Field of the Invention

The present invention relates to an apparatus for checking the state of interference between the computer graphics (CG) models of objects generated in a computer and the method thereof.

2. Description of the Related Art

Lately, in mechanical CAD (computer-aided design) systems for simulating the assembled state of products, etc., it has been required to check on the state of interference between the components in an assembly model representing the assembled state and to display the position of interference. The conventional checking methods of the state of interference between objects are classified as follows.

(1) A method using an envelope of spheres. The state of interference between objects is judged by enveloping objects with a set of spheres and repeating the check on the interference between the spheres. Technologies corresponding to this method include U.S. Pat. Official Gazette No. 4,578,757 (Stark), U.S. Pat. Official Gazette No. 4,922,430 (Wavish), U.S. Pat. Official Gazette No. 5,056,031 (Nakano et al.), Japanese Patent Laid-open 2-224004 (Kan Nakano et al.), Japanese Patent Laid-open 6-83422 (Kenji Iriguchi et al.), Japanese Patent Laid-open 6-259506 (Miwako Doi et al.) and Japanese Patent Laid-open 7-100733 (Akihiro Goto et al.).

(2) A space is divided into a set of fine grids, and a space map in which codes are allocated to both an area occupied by an object and an unoccupied area, is prepared. Then, the state of interference is judged by retrieving where on the space map other targets are located. A method using an octonal tree belongs to this group. Technologies corresponding to this method include U.S. Pat. Official Gazette No. 5,150,452 (Pollack) and U.S. Pat. Official Gazette No. 5,347,459 (Greenspan et al.) In particular, the method by Greenspan et al. also adopts the method using an envelope of spheres in (1) in combination.

(3) A map consisting of an interfering area: and a non-interfering area is drawn on a configuration space, which is well known in a field of robotics, and interference is measured in this space. Technologies corresponding to this method include U.S. Pat. Official Gazette, No. 5,047,916 (Kondo). In Kondo's method, a configuration space is divided into grids, and a map for interference judgement is prepared.

(4) A method based on the calculation of a distance between the nearest points of a convex polyhedron. Technologies corresponding to this method include a method by Gilbert et al. (E. G. Gilbert, D. W. Johnson and S. S. Keerthi, IEEE Journal of Robotics and Automation, Vol. 4, No. 2, pp. 193–203, 1988).

However, the conventional interference checking methods described above have the following problems.

Out of the conventional interference checking methods, methods (1) through (3) target an arbitrary non-convex object, and though they have a wider application range, they have the following problems compared with method (4) which is used for a convex polyhedron.

Method (1) needs a pretreatment of enveloping an object with spheres, and in the case of a convex polyhedron requires extra calculation compared with the method of Gilbert et al. Since a distance between target objects is not calculated, how much margin is left for interference, etc. cannot be measured.

In method (2), the pretreatment to prepare a map in which space is divided into grids takes a long time. If the environment changes, the map has to be prepared again, and real time processing for environmental fluctuation cannot be performed. Furthermore, since a space is divided into grids, a position cannot be calculated to an accuracy higher than a unit of one grid.

In method (3), it takes a long time to prepare a configuration space. As in method (2), when the environment changes, a map has to be prepared again, and real time processing for environmental fluctuation cannot be performed. When a configuration space is divided into grids like Kondo's method, a position cannot be calculated to an accuracy higher than a unit of one grid.

On the other hand, although method (4) requires no special pretreatment and a distance between target objects can be calculated at high speed, the shape of targets is limited to a convex polyhedron.

When, along with the recent advent of high-performance computers, etc., three-dimensional simulation is performed, many objects are moved in a three-dimensional virtual space. Therefore, a check on interference between the objects is often needed. It is also needed to verify whether or not an assembly component composed of many discrete components can be realized without any interference between the discrete components.

However, since methods (1) through (4) are all checking methods for one-to-one interference between objects, a check has to be repeated for every possible combination of many objects when a check on interference among the objects is required.

Furthermore, since in the case of objects in a recent virtual space, in order to improve reality, an astronomical number of pieces of surface information (polygons) representing an object are used, and a great number of repeated calculations are needed even in the case of a check on one-to-one object interference. When a check on interference among:many objects is made using, such a calculation method, it takes an enormous calculation time and is not realistic.

Since, as the number of objects increases, the calculation time needed for an interference check astronomically increases, it is actually impossible to automatically perform a check on interference among many objects. Under these circumstances, a user manually selects and designates objects to be checked out of many objects, and a check on one-to-one interference between objects is performed for the specific designated objects, if necessary.

SUMMARY OF THE INVENTION

An object of the present invention is to provide an interference checking apparatus for automatically performing an efficient interference check on the CG models of many non-convex objects generated on a computer and the method thereof.

According to the first aspect of the present invention, the interference checking apparatus comprises a storage unit, a projector unit, an extractor unit, a judgement unit and an output unit, and checks the interference state between a plurality of objects generated on a computer.

The storage unit stores object data representing a plurality of objects, and the projector unit generates one-dimensional projection data representing each of the plurality of objects using the object data. The extractor unit extracts a pair of objects with a possibility of interference out of the plurality of objects using the generated projection data, the judgement unit performs the interference check of the extracted pair of objects, and the output unit outputs the result of the interference check.

According to the second aspect of the present invention, the interference checking apparatus comprises a storage unit, an updating unit, a first judgement unit, a display unit, a calculator unit and a second judgement unit, and checks the interference state between a plurality of objects generated on a computer.

The storage unit stores both the position information of vertices composing each of the plurality of objects and the parental relation among the plurality of objects, and the updating unit updates the position information of the vertices of a moved object, if necessary, when the object moves. The first judgement unit performs the check of the interference among the plurality of objects at one time based on the updated position information of the vertices, and the display unit graphically displays an interference position where interference is judged to occur. The calculator unit selects one or more objects in the vicinity of the interference position and calculates the shortest distance between the one or more objects and the other objects, and the second judgement unit performs the interference check between the one or more selected objects and the other objects by judging whether or not the obtained shortest distance exceeds a threshold.

According to the third aspect of the present invention, the interference checking apparatus comprises a first interference checking unit and a second interference checking unit, and checks the interference state of three or more objects generated on a computer.

The first interference unit extracts a pair of objects with a possibility of interference out of the three or more objects, and the second interference unit performs the interference check of the extracted pair of objects.

BRIEF DESCRIPTION OF THE DRAWINGS

FIG. 1 shows the principle of the interference checking apparatus of the present invention.

FIG. 3 shows the configuration of an information processing device.

FIG. 13 shows the listed display of components.

DESCRIPTION OF THE PREFERRED EMBODIMENTS

Figure 2:
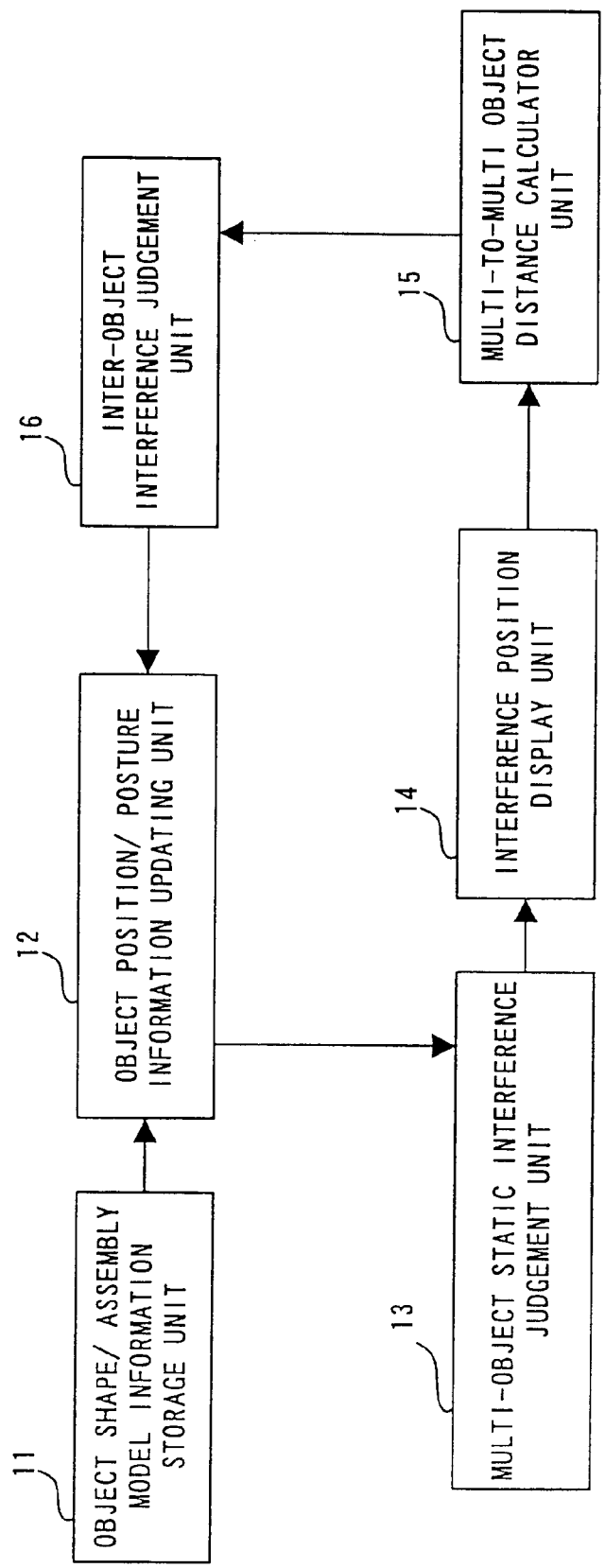
FIG. 2 shows the configuration of the interference checking apparatus of a preferred embodiment.

The detailed preferred embodiments are described below with reference to the drawings.

FIG. 1 shows the principle of the interference checking apparatus of the present invention.

According to the first principle of the present invention, the interference checking apparatus comprises a storage unit 1, a projector unit 2, an extractor unit 3, a judgement unit 4 and an output unit 5, and checks the interference state of a plurality of objects generated on a computer.

The storage unit 1 stores object data representing a plurality of objects, and the projector unit 2 generates one-dimensional projection data representing each of the plurality of objects using the object data. The extractor unit 3 extracts a pair of objects with a possibility of interference out of the plurality of objects using the generated projection data, the judgement unit 4 performs the interference check of the extracted pair of objects and the output unit 5 outputs the result of the interference check.

The object data stored by the storage unit 1 includes information on, for example, the shape of an object, the position in an XYZ coordinate system of the object, the parental relation of the objects, etc., and the projector unit 2 projects each object on each of the X, Y and Z axes and calculates the projection data of a segment. Then, the extractor unit 3 checks the degree of the overlapping of the projection data by comparing a plurality of projection data on each coordinate axis, and selects a pair of objects corresponding to two projection data that overlap each other as a pair with a possibility of interference. Then, the judgement unit 4 performs a more precise interference check on the pair of objects selected like this.

In this way, by dividing the interference check into two stages of an interference possibility judgement and a precise interference judgement, process targets for the precise interference judgement can be focused on and thereby the efficiency in the interference check among many objects is improved. In the interference possibility judgement, too, the check can be performed at high speed by transforming and simplifying the interference problem of objects in a three-dimensional space, to that in an one-dimensional space.

Furthermore, the extractor unit 3 includes a sorter unit 6 for sorting the projection data of the plurality of objects, and can also check the overlapping degree of the projection data based on the sorting result of the projection data. In this case, process targets can be reduced in stages by checking the overlapping degree in other directions of the projection data after checking the overlapping on a sorting direction of the projection data, and the efficiency of the interference possibility judgement can be improved.

According to the second principle of the present invention, the interference checking apparatus comprises a first interference checking unit 7 and a second interference checking unit 8, and checks the interference state of three or more objects generated on a computer.

The first interference checking unit 7 extracts a pair of objects with a possibility of interference out of the three or more objects, and the second interference checking unit 8 performs the interference check on the extracted pair of objects.

For example, the calculation speed of the first interference checking unit 7 is higher than that of the second interference checking unit 8, and the first interference checking unit 7 performs the interference checking on all the possible combinations of the three or more objects. For example, the calculation accuracy of the second interference checking unit 8 is higher than that of the first interference checking unit 7, and the second interference checking unit 8 performs the interference check on all the combinations judged by the first interference checking unit 7 to interfere.

In this way, by dividing the interference check into two stages of a comparatively low-accuracy but high-speed interference possibility judgement and a comparatively low-speed but high-accuracy precise interference judgement, process targets of the precise interference judgement can be focused on, and thereby the efficiency of the interference check of three or more objects can be improved.

For example, the first interference checking unit 7 includes a projector unit 2 and an extractor unit 3. The projector unit 2 projects object data representing each of the three or more objects a lower-order dimensional space, and the extractor unit 3 extracts a pair of objects with a possibility of interference out of the objects using the projected data. The interference checking unit 8 includes a judgement unit 4.

For example, the storage unit 1 shown in FIG. 1 corresponds to an object shape/assembly model information storage unit 11 shown in FIG. 2, which is described later, the projector unit 2, extractor unit 3, judgement unit 4, first interference checking unit 7 and second interference checking unit 8 shown in FIG. 1 correspond to a multi-object static interference judgement unit 13, and the output unit 5 shown in FIG. 1 corresponds to an interference position display unit 14.

In the present invention, whether the CG models of a plurality of objects generated on a computer are separated from or interfere with each other, is judged by the computer, and the nearest point between the objects, interference points among the objects and distances between the objects are calculated at high speed. Then, the processed result is graphically presented to a user on a computer display. It is assumed that target objects for the interference check are arbitrary non-convex objects. The non-convex objects include a non-convex polyhedron.

The interference check of the present invention has the following features.

(1) Performs a static interference check among many objects at high speed by approximating the shape of an object using an envelope figure, such as an rectangular parallelepiped, a sphere, etc.

(2) In the static interference check of (1), after projecting the approximate figure into a lower-dimensional space (for example, on a coordinate axis) and reducing the number of pairs of objects with a possibility of interference by focusing on the pairs in stages, precisely checks interferences of the remaining pairs.

(3) After the static interference check of (1), efficiently identifies an interference position by a clipping process.

(4) After the static interference check of (1), efficiently checks multi-objects to multi-objects interference and efficiently calculates distances between the multi-objects.

Generally speaking, since in a precise interference judgement using the accurate shape of an object, calculation is repeated for many polygons of an object, the accuracy is high, but it takes an enormous process time. However, if the number of the polygons of the object is reduced by using an approximate figure, the accuracy becomes low, but a high-speed interference check becomes available. Therefore, first, pairs of objects with a possibility of interference are selected out of many objects by an interference check using an approximate figure, and then a precise interference check is performed using an accurate shape.

In this way, the efficiency of an interference check among many objects is improved, and the process time is reduced. As a result, the interference among many objects becomes available using a computer within a practical time period, and the process can be automated.

In the following preferred embodiments, the interference checking apparatus downloads an assembly model prepared by a mechanical CAD system, etc. in a memory, and performs the static interference check of a plurality of objects contained in the assembly model at high speed. Then, the interference checking apparatus displays candidates of interference points on a display screen. At this time, a user moves an object in the vicinity of the displayed candidates of interference points interactively, and the interference checking apparatus checks the interference and calculates the distance in real time.

FIG. 2 shows the configuration of the interference checking apparatus of a preferred embodiment. The interference checking apparatus shown in FIG. 2 comprises an object shape/assembly model information storage unit 11, an object position/posture information updating unit 12, a multi-object static interference judgement unit 13, an interference position display unit 14, a multi-to-multi object distance calculator unit 15 and an inter-object interference judgement unit 16.

The object shape/assembly model information storage unit 11 stores information on assembly models and the shape of objects. This information includes a set of vertices for representing the shape of objects, a parental relation for representing the assembly relation among objects, the position of objects, the posture of objects, the joint relation among objects, etc.

The object position/posture information updating unit 12 calculates the amount of changes with the lapse of time of the shape information for both the position and posture of the objects. For example, when an object moves, the amount of change of each of the vertices of the object is calculated. The multi-object static interference judgement unit 13 performs a combinational check for all the interferences among many objects contained in an assembly model at one time, and outputs the interference judgement data.

The interference position display unit 14 displays interference positions graphically based on the interference judgement data inputted from the multi-object static interference judgement unit 13. The multi-to-multi object distance calculator unit 15 calculates the shortest multi-to-multi (including one-to-multi) object distance of all the combinations of objects displayed by the interference position display unit 14 in real time. The inter-object interference judgement unit 16 judges the interference state among the objects in real time based on the distance information calculated by the multi-to-multi object distance calculator unit 15.

The interference checking apparatus shown in FIG. 2 is configured using an information processing device (computer) shown in FIG. 3. The information processing device shown in FIG. 3 comprises a CPU (central processing unit) 21, a storage device 22, a RAM (random access memory) 23, a data input device 24, a graphic display 25, an input interface (I/F) 26 and an output interface 27, and they are connected through a bus system.

The storage device 22 includes a ROM (read only memory), a magnetic disk device, an optical disk device, a magneto-optical disk device, etc., and stores data and programs (execution modules) needed in an interference checking process.

The storage device 22 stores data, such as operation environment, object shapes, assembly models, the initial positions of objects, execution modules for executing a process corresponding to each unit shown in FIG. 2, execution modules for displaying the movement of objects graphically, etc.

The CPU 21 performs the coordinate transformation of objects, a static interference check, a nearest vector calculation, an operation to display the calculation result, an operation to display the movement of objects graphically and all other logical operations using the data and execution modules read from the storage device 22. Since a process of updating the position and posture of objects in a space can be considered as a process of transforming the coordinate system of an object to another coordinate system, such a process is called the coordinate transformation of an object here.

Each of the object position/posture information updating unit 12, a multi-object static interference judgement unit 13, an interference position display unit 14, a multi-to-multi object distance calculator unit 15 and an inter-object interference judgement unit 16 shown in FIG. 2 is mounted as a software component corresponding to a specific program code stored in the storage device 22, and performs its own assigned process by running the program.

The RAM 23 is a resident memory, and comprises a shape data/assembly data memory 31, a coordinate transformation data memory 32, a static interference data memory 33 and a nearest vector data memory 34.

The shape data/assembly data memory 31 corresponds to the object shape/assembly model information storage unit 11 shown in FIG. 2, and stores data, such as operation environment, object shape, etc. read from the storage device 22 by the CPU 21. The coordinate transformation data memory 32 stores data on the position and posture of objects calculated by the CPU 21 based on the movement instruction inputted through the data input device 24.

The static interference data memory 33 stores the result of a static interference check performed by the CPU 21 using the data of both the shape data/assembly data memory 31 and the coordinate transformation data memory 32. The nearest vector data memory 34 stores the nearest vector data calculated by the CPU 21 based on the result of the static interference check. The data include the nearest points between objects, the distance between objects, the result of interference judgement, etc.

The data input device 24 includes a keyboard, a pointing device, a touch panel, etc., and inputs information designated by a user, such as operation environment, the position/posture of an object, a movement instruction, etc. to the CPU 21. The graphic display 25 graphically displays each of the data of the memories 32, 33 and 34 in the RAM 23 received through the interface 27. The graphic display can also output inquiries to a user.

Figure 4:
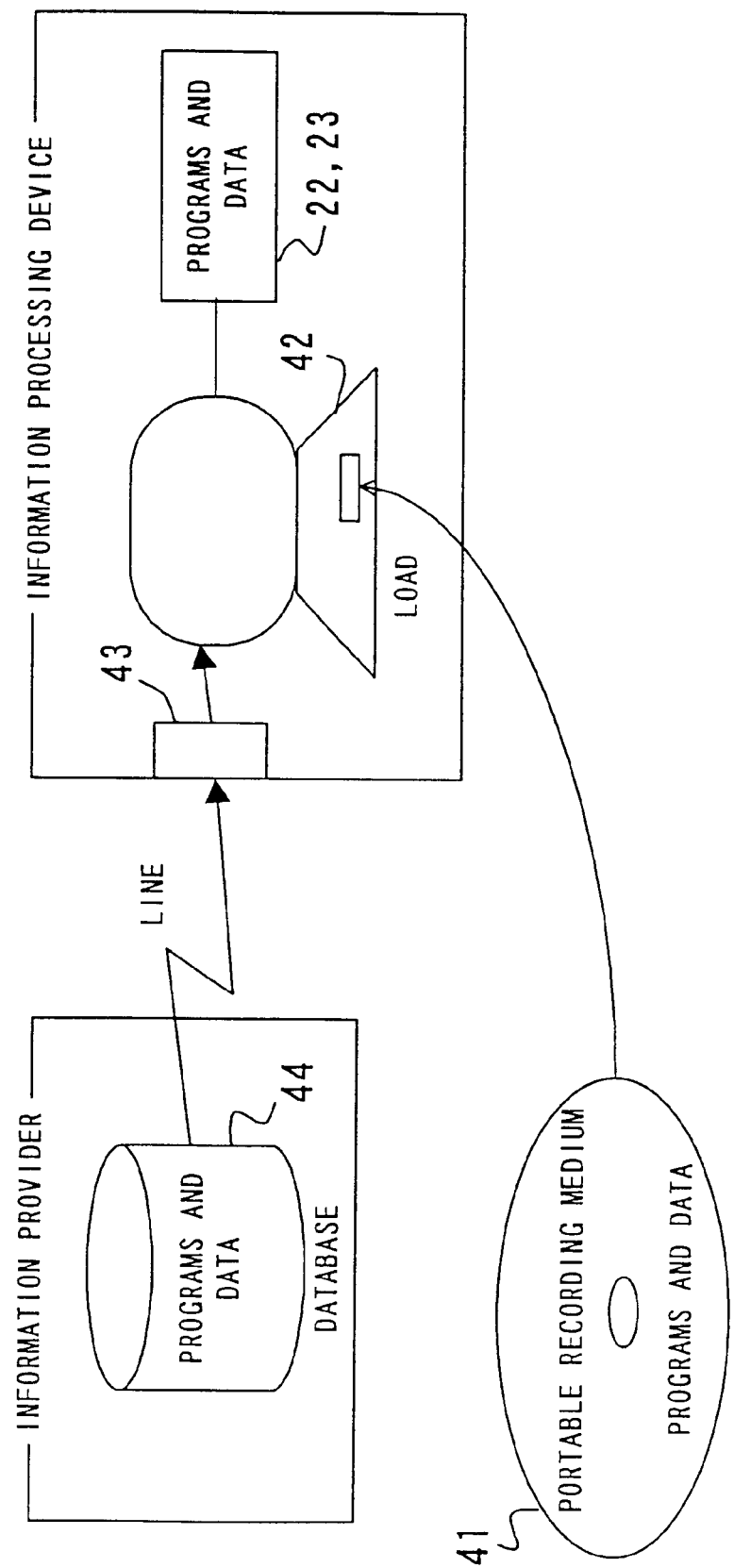
FIG. 4 shows recording media.

FIG. 4 shows the system configuration using computer-readable recording media for supplying the information processing device shown in FIG. 3 with programs and data.

A portable recording medium 41 includes a memory card, a floppy disk, a CD-ROM (compact disk read only memory), an optical disk, a magneto-optical disk, etc., and stores the programs and data described above. The information processing device downloads programs and data from the portable recording medium 41 through a medium driver device 42, and executes the necessary processes using the programs and data.

The information processing device can also download the programs and data from an external database 44 through a network connecting device 43, and can execute necessary processes using the programs and data. In this case, the network connecting device 43 communicates with external devices through an arbitrary network (line), such as a LAN (local area network), etc. and performs data exchange accompanying the communication.

Figure 5:
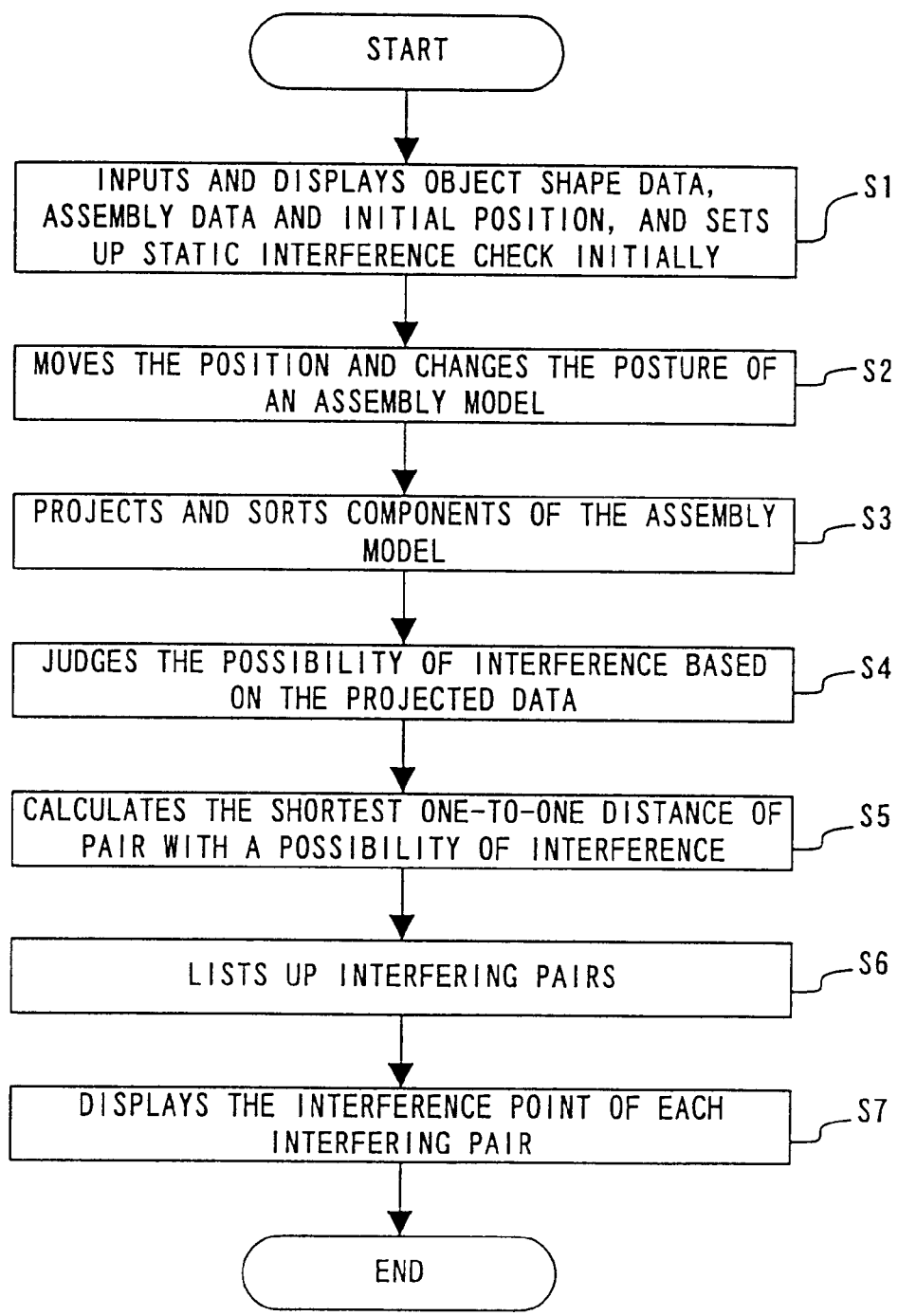
FIG. 5 is a flowchart showing the interference checking process.

FIG. 5 is a flowchart showing the interference checking process by the object position/posture information updating unit 12, a multi-object static interference judgement unit 13 and an interference position display unit 14 shown in FIG. 2.

First, the object position/posture information updating unit 12 reads object shape data, assembly data, the initial position of each object, etc. being a target for a static interference check, performs the initial settings, and displays them on a screen (step S1). At this time, the object position/posture information updating unit 12 calculates a figure enveloping each component of an assembly model represented by the assembly data, and displays the figure together with the component. When a rectangular parallelepiped is used for this envelope figure, the position of the vertices of the rectangular parallelepiped is calculated.

Figure 6:
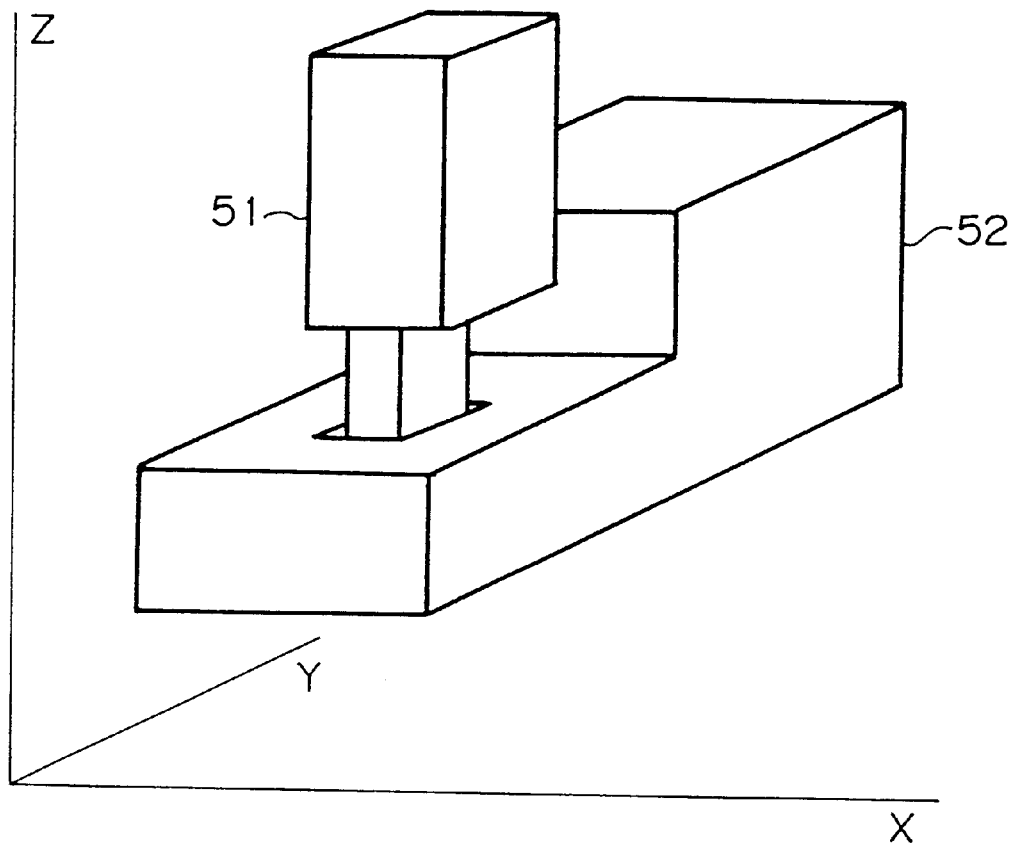
FIG. 6 shows an assembly model.
Figure 7:
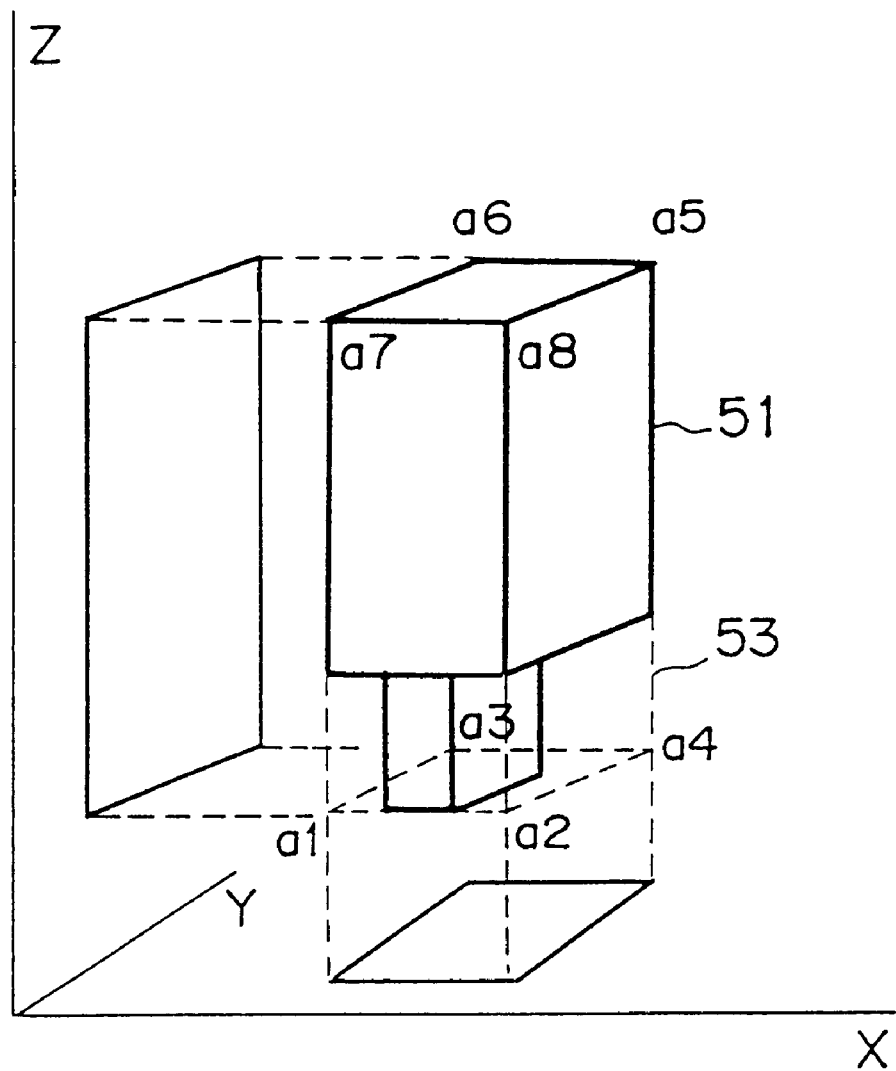
FIG. 7 shows a first rectangular parallelepiped.
Figure 8:
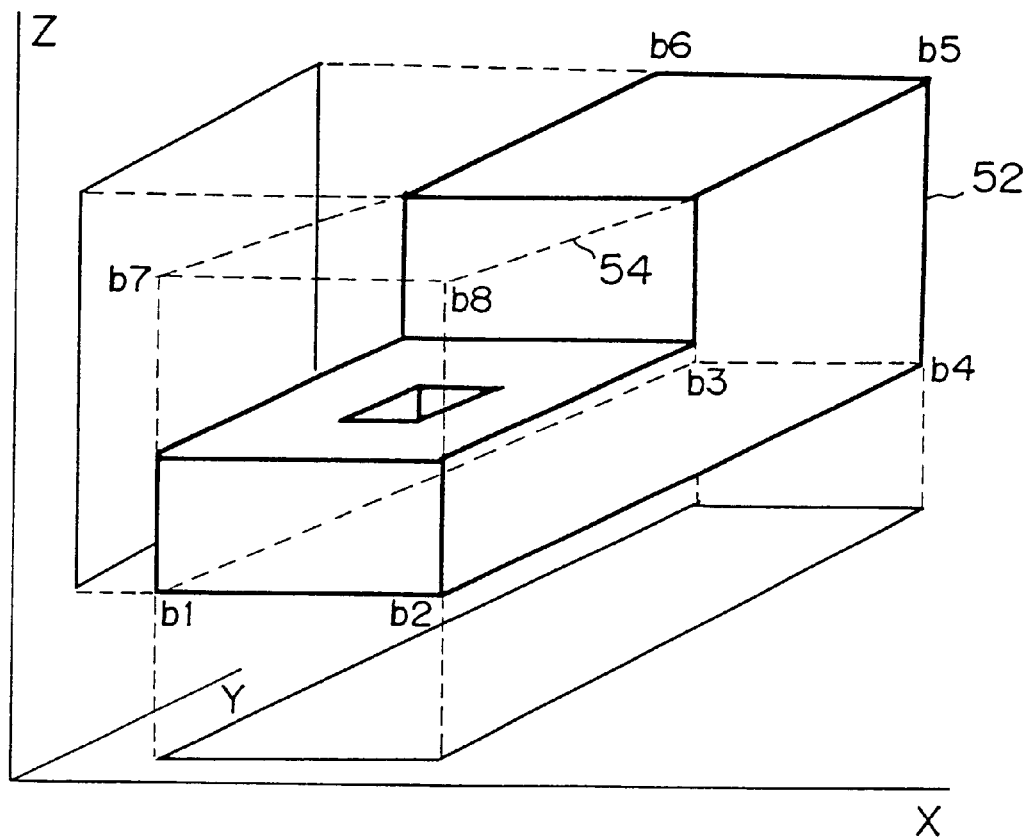
FIG. 8 shows a second rectangular parallelepiped.

For example, in the case of an assembly model shown in FIG. 6, the set of the vertices of a rectangular parallelepiped 53 enveloping a component 51 becomes (a1, a2, a3, a4, a5, a6, a7, a8) as shown in FIG. 7, and the set of the vertices of a rectangular parallelepiped 54 enveloping a component 52 becomes (b1, b2, b3, b4, b5, b6, b7, b8) as shown in FIG. 8.

Then, the object position/posture information updating unit 12 performs the coordinate transformation (update) of the position and posture of an assembly model according to a user's movement instruction (step S2). At this time, simultaneously the object position/posture information updating unit 12 performs the same coordinate transformation of a figure enveloping each component, and calculates a new figure further enveloping the figure resulted from the transformation.

Figure 9:
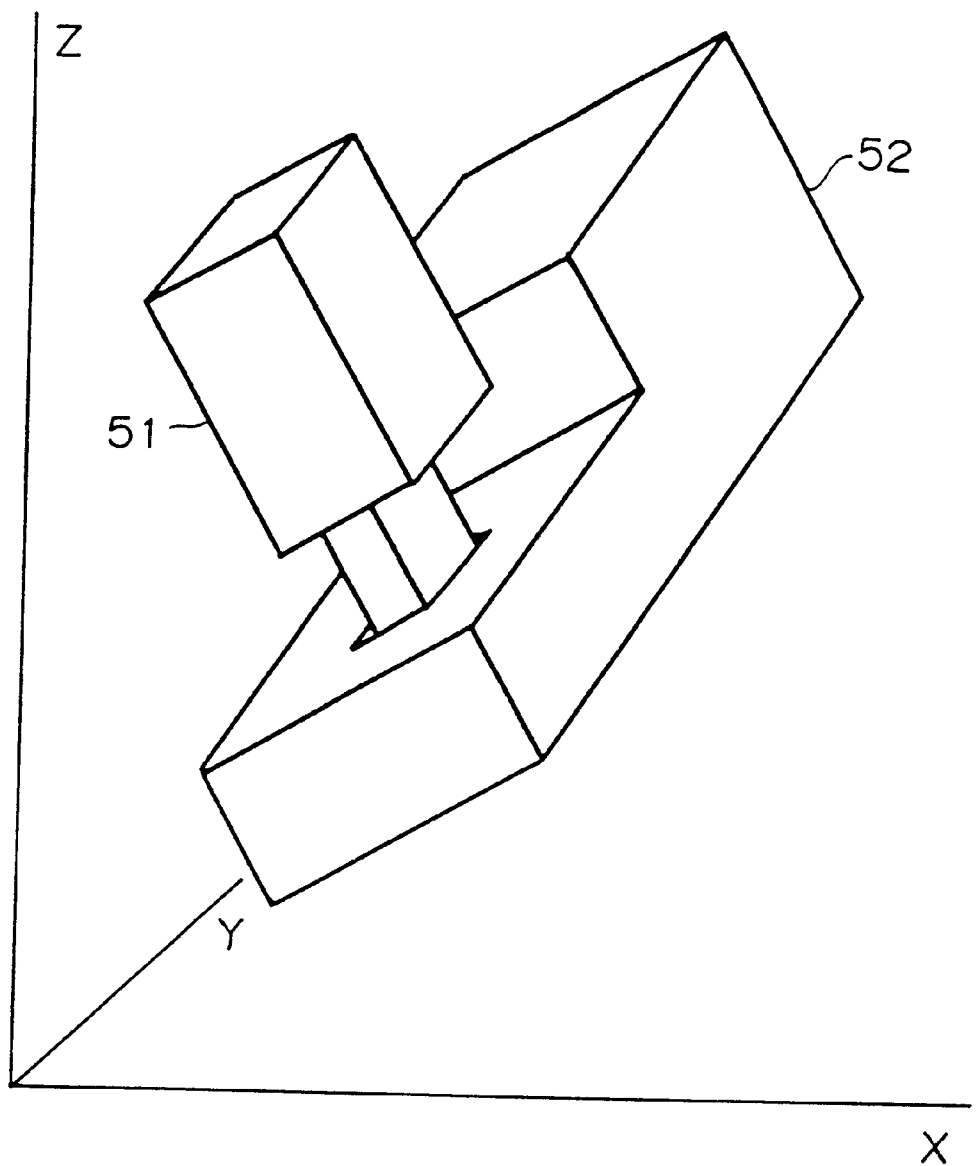
FIG. 9 show a coordinate transformation.
Figure 10:
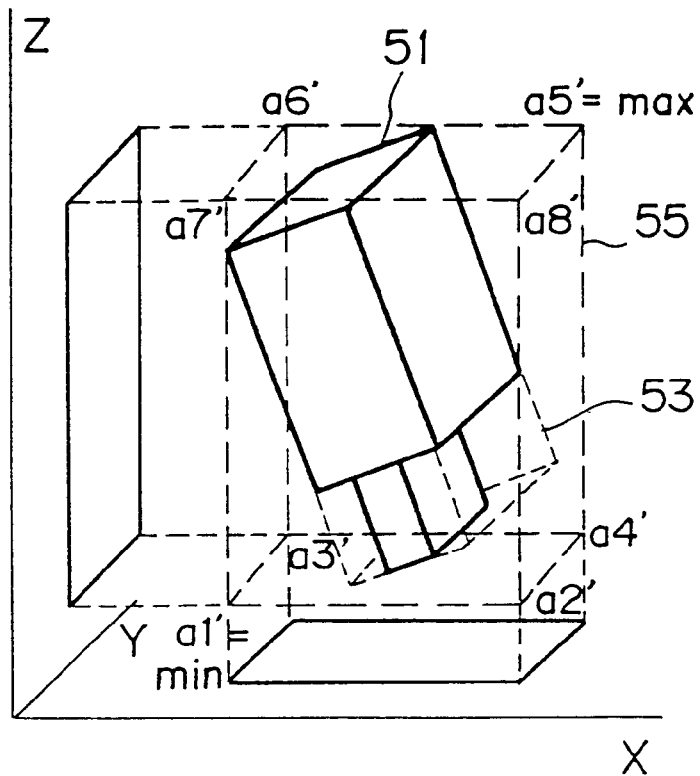
FIG. 10 shows a third rectangular parallelepiped.
Figure 11:
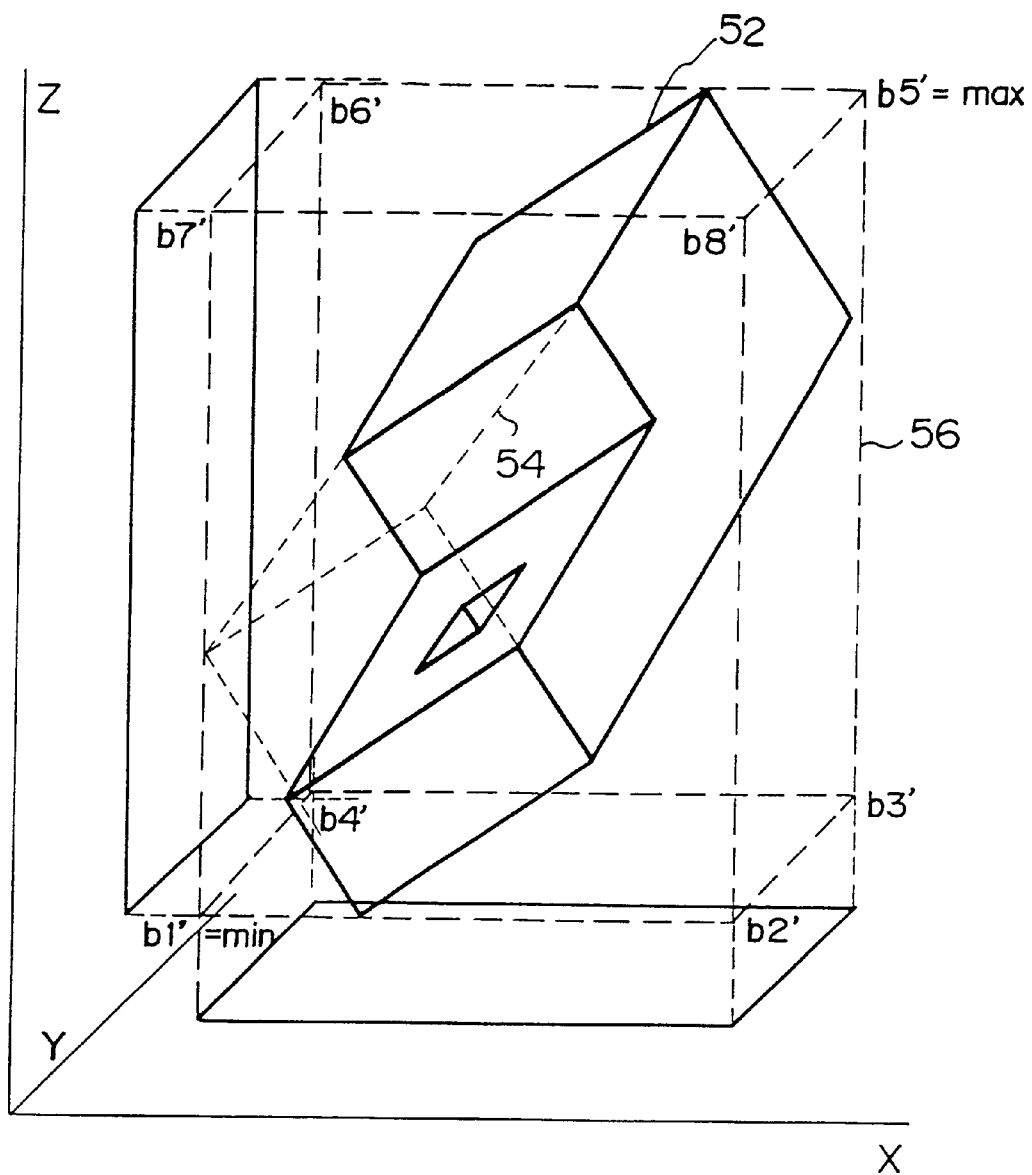
FIG. 11 shows a fourth rectangular parallelepiped.

For example, when a coordinate transformation shown in FIG. 9 is performed for the assembly model shown in FIG. 6, the original rectangular parallelepipeds 53 and 54 are transformed into those inclined against an XYZ coordinate system as shown in FIGS. 10 and 11. For this reason, rectangular parallelepipeds 55 and 56 for enveloping these inclined rectangular parallelepipeds are calculated and displayed.

To simplify processes in later stages, each edge of these rectangular parallelepipeds is set parallel to one of the X axis, Y axis and Z axis. The set of the vertices of the rectangular parallelepiped 55 shown in FIG. 10 becomes (a1', a2', a3', a4', a5', a6', a7', a8'), and the set of the vertices of the rectangular parallelepiped 56 shown in FIG. 11 becomes (b1', b2', b3', b4', b5', b6', b7', b8').

Then, the multi-object static interference judgement unit 13 projects the calculated envelope figure on each of the X, Y and Z axes, and calculates the projection data (step S3). The projection data correspond to a segment on each coordinate axis, and indicate the scope of a space in which the envelope figure exists in the XYZ coordinate system. For projection data, for example, both the maximum and minimum values of each of the X, Y and Z coordinate values of the vertices composing the envelope figure, are used.

For example, in the case of the rectangular parallelepiped 55 shown in FIG. 10, the coordinate value of vertex a1' nearest to the origin of the coordinate system corresponds to the minimum value, and the coordinate value of vertex a5' farthest from the origin corresponds to the maximum value. In the case of the rectangular parallelepiped 56 shown in FIG. 11, the coordinate value of vertex b1' corresponds to the minimum value, and the coordinate value of vertex b5' corresponds to the maximum value.

Then, the multi-object static interference judgement unit 13 sorts the projection data of all the envelope figures calculated in this way, in an ascending order of minimum values. Then, using the sorted projection data, the multi-object static interference judgement unit 13 judges the interference possibility among the components, and selects pairs of components with a possibility of interference (step S4).

In this way, by approximating the shape of a process target component with an envelope figure, any component of an arbitrary shape can be handled, and thereby the processes of the component, such as the calculation of projection data, etc. become easy to perform. However, when the shape of an original component is a comparatively simple figure, such as a rectangular parallelepiped, etc., an envelope figure is not necessarily needed to be used, and the interference possibility can be judged using the original shape as it is.

Then, a precise judgement on whether or not components interfere with each other, is made by calculating the shortest distance between the components of the selected pairs (step S5). Here, the distance calculation is performed using the shape of the component itself instead of an envelope figure of the component. For the one-to-one calculation of the shortest distance and the one-to-one interference check between components, a variety of methods other than the conventional methods described earlier can also be used.

For example, Japanese Patent Laid-open 7-134735 ("The Nearest Point Retrieval Method and Pre-treatment Method thereof") discloses a method of performing an inner product evaluation using grid points calculated from directed graph type structure data in the retrieval of the nearest point among polygons. Japanese Patent Laid-open 8-77210 ("Interference Check Pre-treatment Method") discloses a method of dividing the polygon set of non-convex polyhedrons into a high-speed partial polygon set of convex elements and applying a method of Gilbert et al. to the interference check among polyhedrons.

Japanese Patent Laid-open 9-27046 ("Interference Check Method") discloses a method of performing an interference check at high speed using the binary tree of a sphere enveloping an object. Japanese Patent Laid-open 9-128601 ("Inter-object Distance Operation Device and Inter-object Distance Operation Program Recording Medium") discloses a method of calculating a distance between convex objects, with a high accuracy using the position vector of a control point for defining the surface patch of two convex objects.

If the calculated distance between components is smaller than a predetermined threshold $\epsilon$ which is a sufficiently small value, it is considered that the components interfere with each other, while if not, it is considered that the components do not interfere with each other. Then, the multi-object static interference judgement unit 13 lists up all the pairs of interfering components (interfering pairs) (step S6). At this time, the multi-object static interference judgement unit 13 stores the component names of the interfering pairs, the three-dimensional coordinate value of a point where interference occurs (interference point), the distance between the components, etc. The interference point is provided, for example, at either of the nearest points of two components or in an appropriate position of the vicinity.

Figure 12:
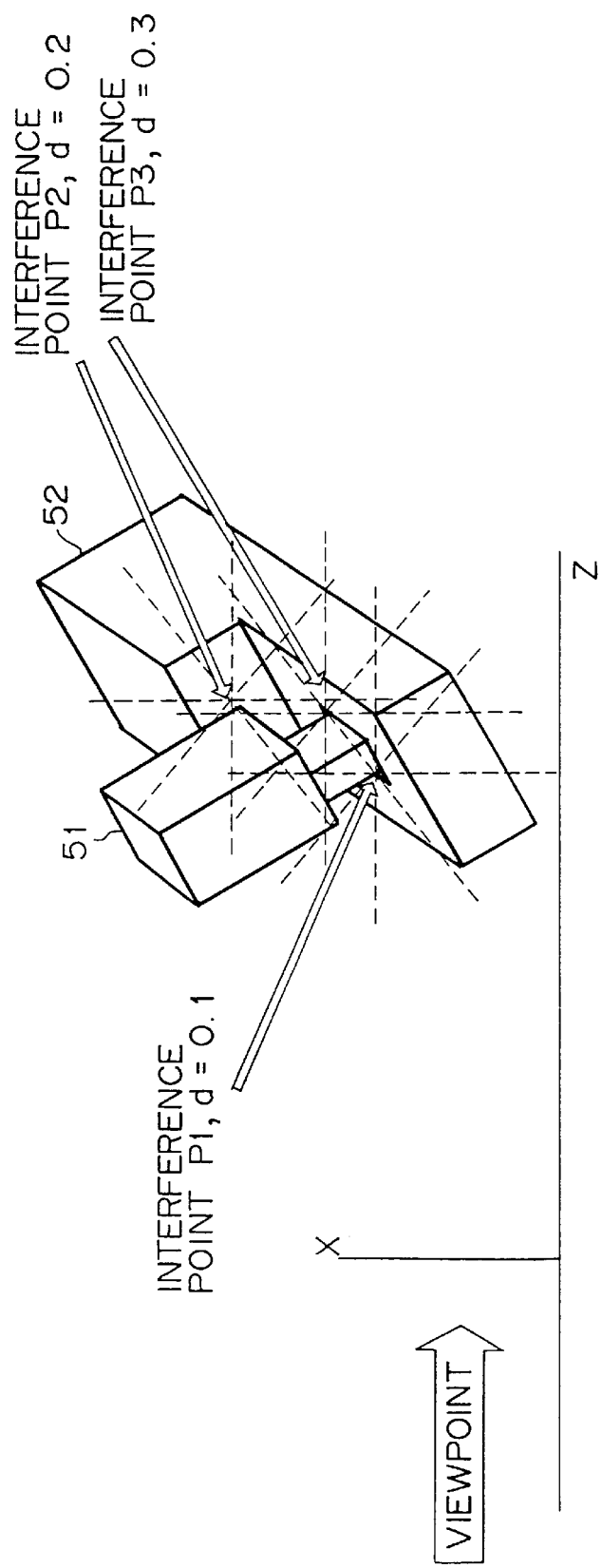
FIG. 12 shows displayed interference points.

Then, the interference position display unit 14 displays the interference point of each of the listed interfering pairs graphically (step S7), and terminates the process. At this time, as shown in FIG. 12, each interference point is represented by a flashing point, and a distance d between components is displayed for each interference point. Component names corresponding to each interference point are listed up as shown in FIG. 13. Here, the name of the component 51 corresponds to component A, and that of the component 52 corresponds to component B. By employing such a display, a user can easily recognize both the precise distance between components at an interference point and the interference point of each component.

Next, both sorting and interference possibility judgements performed in steps S3 and S4 are described in detail. It is assumed here that a suffix for identifying each component of an assembly model is i, the farthest vertex from the origin out of the vertices of a rectangular parallelepiped enveloping the component is max(i), and the nearest vertex to the origin is min(i). Furthermore, the coordinate value (X, Y, Z) of these vertices are assumed to be expressed as follows.

max(i)=(maxX(i), maxY(i), maxZ(i)), min(i)=(minX(i), minY(i), minZ(i))

In this case, projection data projX(i), projY(i) and projZ(i) of this rectangular parallelepiped on the X, Y and Z axes, respectively, are expressed as follows.

projX(i)=(maxX(i), minX(i)), projY(i)=(maxY(i), minY(i)), projZ(i)=(maxZ(i), minZ(i))

Figure 14:
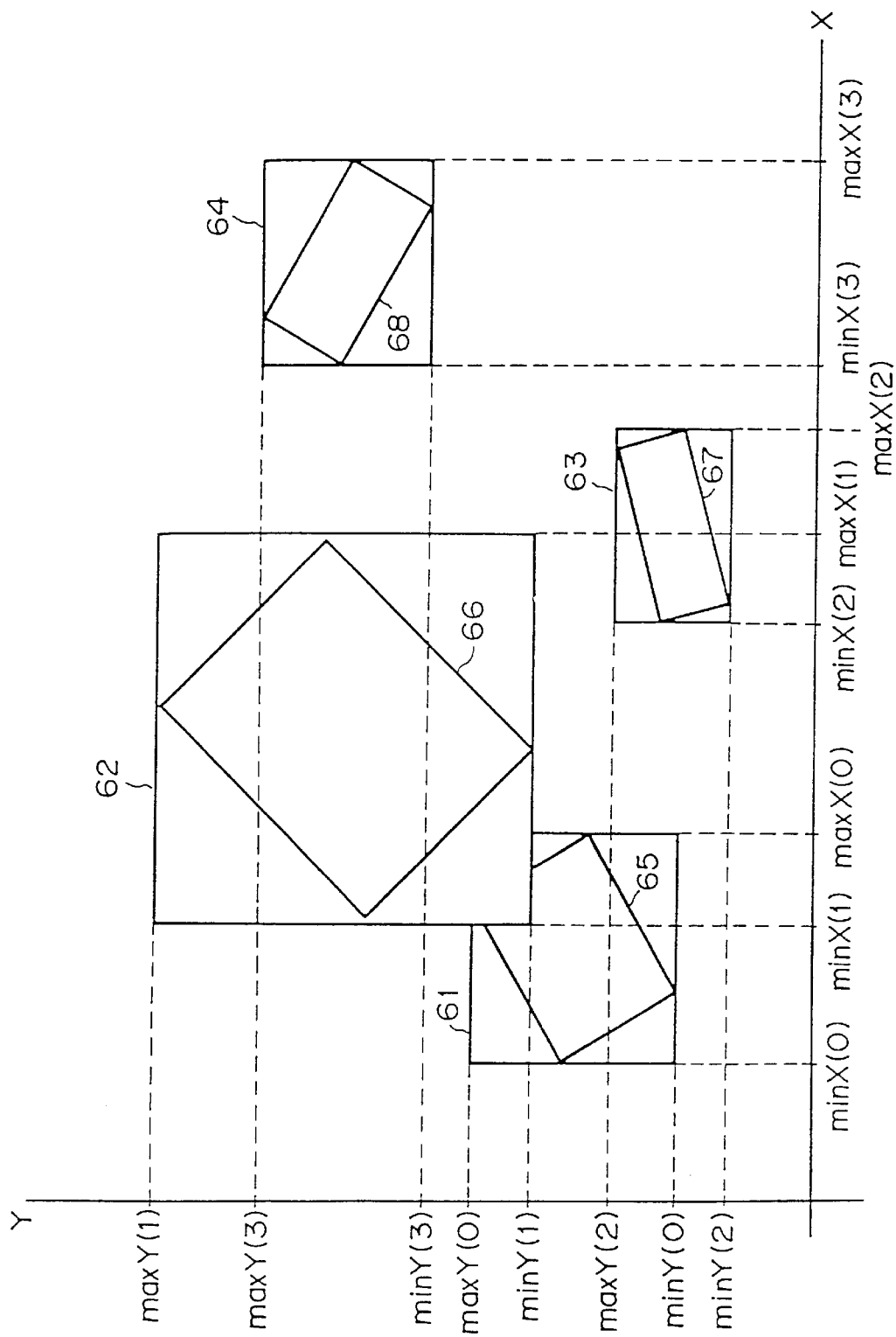
FIG. 14 shows first projection data.

FIG. 14 shows the result obtained when four rectangular parallelepipeds are projected on an XYZ plane and are further projected on both X and Y axes. In FIG. 14, rectangles 61, 62, 63 and 64 indicate the projections on the XY plane of the rectangular parallelepipeds generated after a coordinate transformation, and rectangles 65, 66, 67 and 68 indicate the projections on the XY plane of the rectangular parallelepipeds generated before the coordinate transformation.

Assuming that the suffixes of the rectangular parallelepipeds corresponding to the rectangles 61, 62, 63 and 64 are i=0, 1, 2 and 3, respectively, projection data on the X and Y axes of the rectangular parallelepiped, projX(i) and projY(i), respectively, are as follows.

Rectangular 61 projX(0)=(maxX(0), minX(0)), projY(0)=(maxY(0), minY(0))

Rectangular 62 projX(1)=(maxX(1), minX(1)), projY(1)=(maxY(1), minY(1))

Rectangular 63 projX(2)=(maxX(2), minX(2)), projY(2)=(maxY(2), minY(2))

Rectangular 64 projX(3)=(maxX(3), minX(3)), projY(3)=(maxY(3), minY(3))

Projection data projZ(0) on the Z axis can also be calculated in the same way. If the X axis is selected for a sorting direction and projX(i) are sorted in the ascending order of minX(i), projX(0), projX(1), projX(2) and projX(3) are arranged in that order. Then, according to the order resulted from the sorting, their interference possibilities are judged using the projection data.

Figure 15:
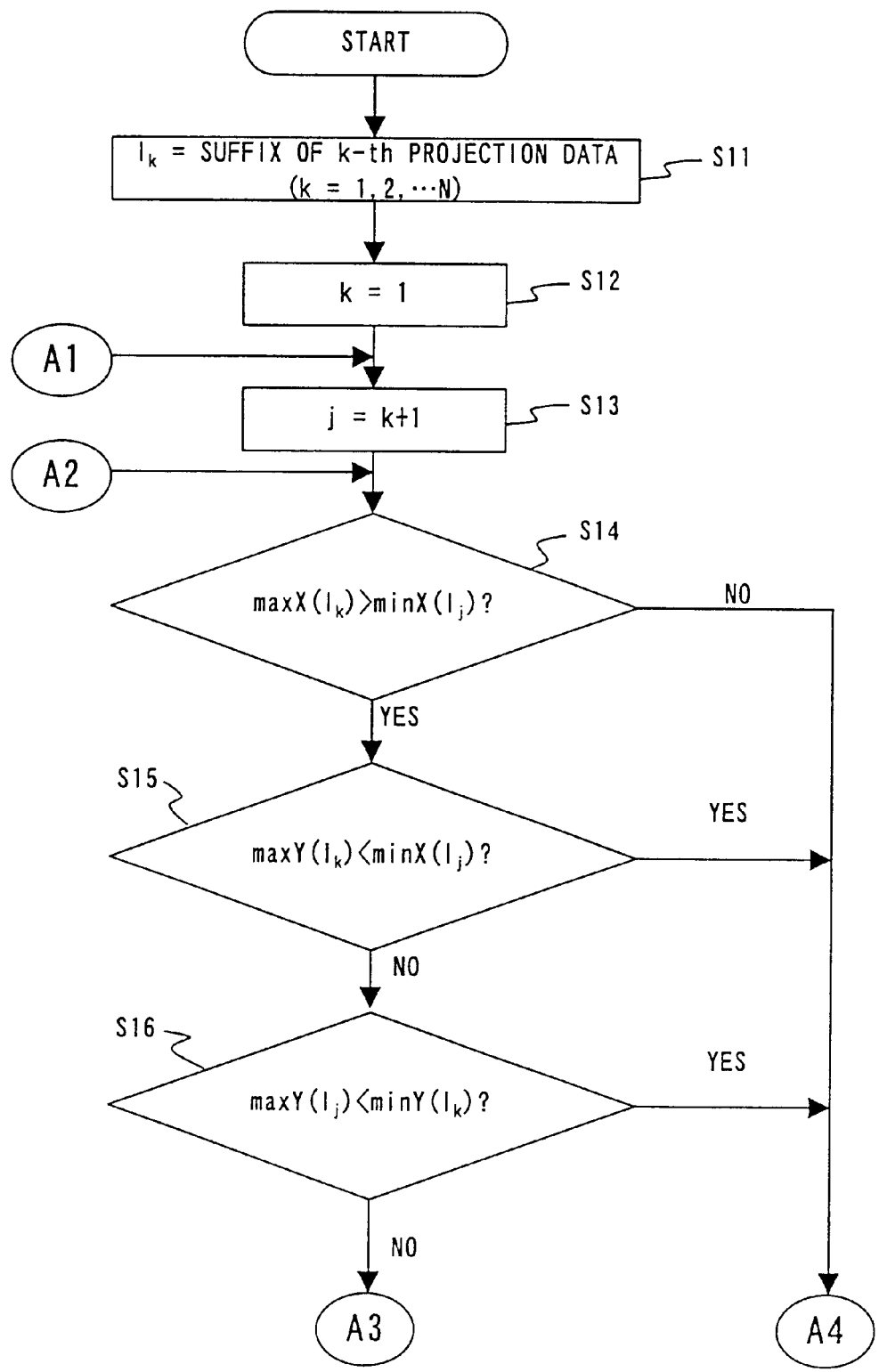
FIG. 15 is a flowchart showing an interference possibility judgement process (No. 1).
Figure 16:
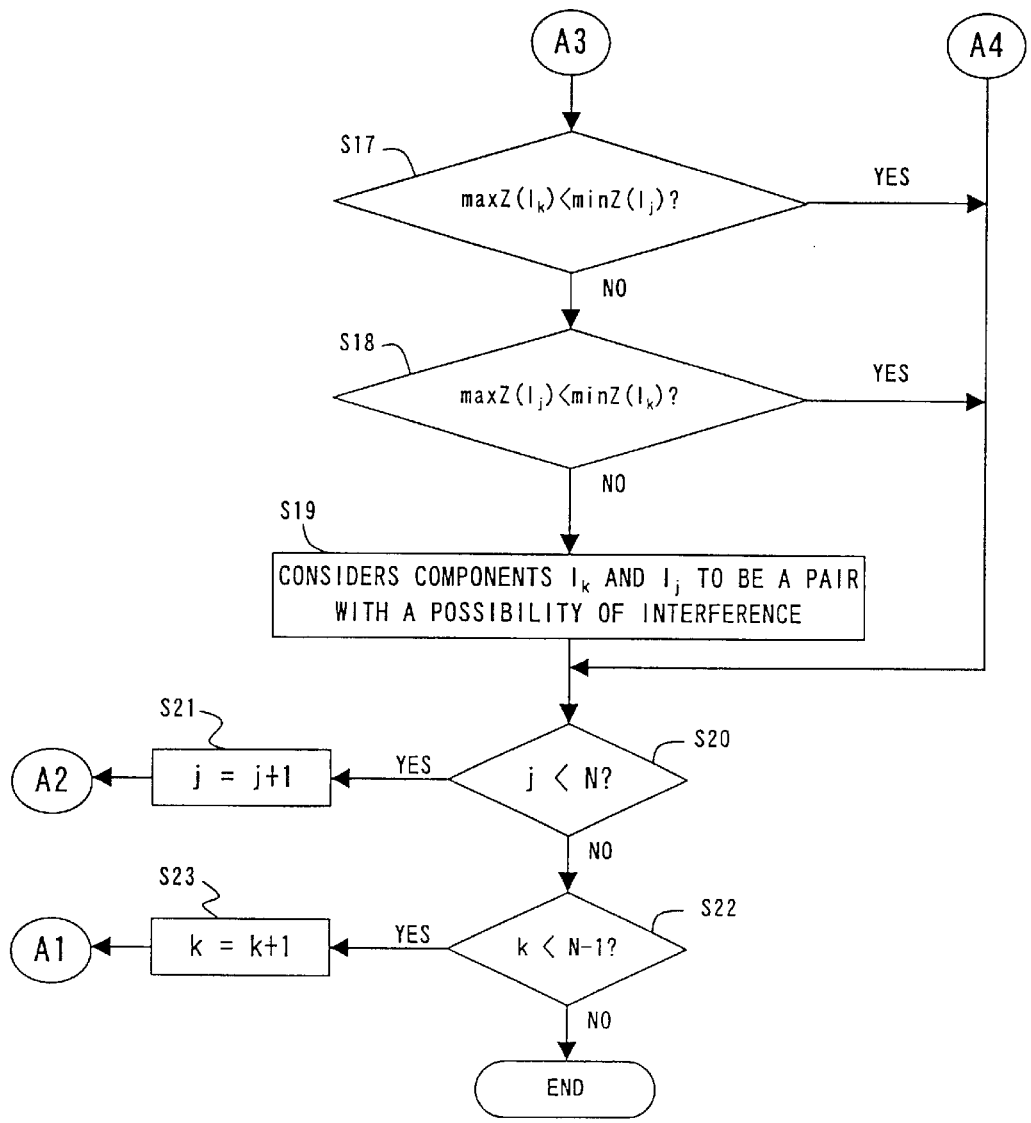
FIG. 16 is a flowchart showing an interference possibility judgement process (No. 2).

FIGS. 15 and 16 are flowcharts showing the interference possibility judgement process in the case where the X axis is selected for a sorting direction. First, in the sorting result, the multi-object static interference judgement unit 13 assigns $I_k$ (k=1, 2, ..., N) to the suffix of projection data in the k-th order (step S11 in FIG. 15), and sets k=1 (step S12). N indicates the number of target components. In the case of the projection data shown in FIG. 14, N=4, and $I_1$=0, $I_2$=1, $I_3$=2 and $I_4$=3.

Then, the multi-object static interference judgement unit 13 assigns $I_j$ to the suffix of projection data in the order later than $I_k$, compares maxX($I_k$) and minX($I_j$), and selects $I_j$ such that maxX($I_k$)>minX($I_j$) is satisfied. Since minX($I_k$)<minX($I_j$) is guaranteed by the sorting, such projection data, projX($I_k$) and projX($I_j$) are overlapped with each other. Therefore, components $I_k$ and $I_j$ are considered to be a pair candidate with a possibility of interference.

First, j=k+1 is assigned (step S13), and $I_j$ is assumed to be the suffix of projection data projX($I_j$) which is compared with projX($I_k$). Then, the multi-object static interference judgement unit 13 judges whether or not maxX($I_k$)>minX($I_j$) is satisfied (step S14).

In FIG. 14, since when the rectangle 61 of the first order is compared with the rectangle 62 of the second order, maxX($I_1$)=maxX(0)>minX(1)=minX($I_2$), component 0 represented by the rectangle 61 and component 1 represented by the rectangle 62 are considered to be a pair candidate with a possibility of interference.

If maxX($I_k$)>minX($I_j$), the next judgement that is made is whether or not projection data are overlapped on the Y axis. If minY($I_k$)<minY($I_j$) or maxY($I_j$)<maxY($I_k$) is satisfied, projection data projY($I_k$) and projY($I_j$) are considered not to be overlapped, and components $I_k$ and $I_j$ are excepted from pair candidates with a possibility of interference.

Here, first, it is judged whether or not maxY($I_k$)<minY($I_j$) is satisfied (step S15), and if not, it is judged whether or not maxY($I_j$)<minY($I_k$) is satisfied (step S16).

When maxY($I_j$)<minY($I_k$) is also not satisfied, it is judged whether or not projection data are overlapped on the Z axis. If maxZ($I_k$)<minZ($I_j$) or maxZ($I_j$)<minZ($I_k$) is satisfied, projection data projZ($I_k$) and projZ($I_j$) are considered not to be overlapped, and components $I_k$ and $I_j$ are excepted from pair candidates with a possibility of interference.

Here, first, it is judged whether or not maxZ($I_k$)<minZ($I_j$) is satisfied (step S17 in FIG. 16), and if not, it is judged whether or not maxZ($I_j$)<minZ($I_k$) is satisfied (step S18). Then, if maxZ($I_j$)<minZ($I_k$) is also not satisfied, components $I_k$ and $I_j$ are selected as a pair with a possibility of interference (step S19).

In the case of the rectangles 61 and 62 shown in FIG. 14, maxY($I_1$)=maxY(0)>minY(1)=minY($I_2$), and maxY($I_2$)= maxY(1)>minY(0)=minY($I_1$). Therefore, whether or not components 0 and 1 are left to be a pair with a possibility of interference is finally determined by a relation between projection data on the Z axis.

Then, j and N are compared (step S20). If j<N, 1 is added to j (step S21), and the processes of steps S14 and after are repeated. If j=N, all the projection data of an order later than $I_k$ can be considered to have been checked. Therefore, the process of $I_k$ is terminated, and this time, k and N−1 are compared (step S22). If k<N−1, 1 is added to k (step S23), and the processes of steps S13 and after are repeated. If k=N−1, all the combinations of the rectangular parallelepipeds can be considered to have been checked. Therefore, the process is terminated.

If in step S14, the judgement result is NO, and if in steps S15, S16, S17 and S18, the judgement result is YES, it is judged that there is no possibility of interference between components $I_k$ and $I_j$, and the processes of steps S20 and after are executed. In this way, all the pairs of components with a possibility of interference out of all the components of the assembly model can be outputted without exception.

When four rectangles are process targets in FIG. 14, by the judgements in step S14, a pair of component 0 represented by rectangle 61 and component 1 represented by rectangle 62, and a pair of component 1 and component 2 represented by rectangle 63 are considered to be pair candidates with a possibility of interference. Then, by the judgement in steps S15 and S16, the former are left to be a pair candidate with a possibility of interference and the latter is excepted from the candidate list.

Although in this interference possibility judgement process, the judgements in steps S14, S15, S16, S17 and S18 are continued after the suffix $I_j$ is selected, the judgement process in step S14 can also be executed for all $I_j$ together.

In step S14, since the overlapping of projection data on the X axis being a sorting direction is checked, by performing this judgement for all $I_j$ together, the number of pair candidates with a possibility of interference can be greatly reduced at high speed. Therefore, judgement targets for another direction can be limited, and a high-speed processing is available without a sorting.

To simplify the interference possibility judgement process, some or all of the judgements in steps S15, S16, S17 and S18 can also be omitted. However, in this case, there is a possibility that since the number of pairs with a possibility of interference cannot be sufficiently reduced, a time needed for a subsequent precise interference checking process may increase.

When the Y or Z axis is selected for a sorting direction, too, the interference possibility judgement can be performed in the same way. For example, when in FIG. 14, the Y axis is selected for a sorting direction, and projY(i) is sorted in the ascending order of minY(i), projY(2), projY(0), projY(1) and projY(3) are arranged in that order. In this case, the suffix $I_k$ of projection data becomes $I_1$=2, $I_2$=0, $I_3$=1 and $I_4$=3, and the overlapping of the projection data is checked in the order of Y, X and Z axes.

Generally speaking, an arbitrary coordinate axis can be selected for a sorting direction. However, according to an assembly model, a specific direction is often desirable.

For example, when after a plurality of electronic components are arranged on a printed circuit board, two or more of the printed circuit boards are stacked in one direction, the number of pair candidates with a possibility of interference can be efficiently reduced by selecting the stacking direction for a sorting direction. In the same way, when after a plurality of components are assembled into a sub-assembly, two or more of the sub-assemblies are stacked in one direction, it is desirable to select the stacking direction for the sorting direction.

In the static interference check described above, as shown in FIG. 12, many interference points are generated at one time, and the displayed interference points are often hard to see. Some interference points cannot be often seen from outside, since the interference points are inside the assembly model. Under these circumstances, the interference position display unit 14 provides a function to efficiently identify an interference position employing both the shift of a viewpoint and clipping.

Both the viewpoint shift and clipping are well known as the basic technology of CG, and for example, are also used in OpenGL being one of the APIs (application programming interfaces) of a three-dimensional CG library.

For example, when in the list display shown in FIG. 13, a user clicks the box of "Component A, P1" using a pointing device, such as a mouse, etc., component A (component 51 in FIG. 12) is highlighted, and interference point P1 is selectively flashed. At this time, the flashing of other interference points is cancelled.

In the same way, when the box of "Component B, P1" is clicked, component B (component 52 in FIG. 12) is highlighted, and interference point P1 is selectively flashed. Thus, even when many interference points occur simultaneously, an interference point can be clearly recognized by selecting it.

When the box of "Component A, P1" or "Component B, P1" is double-clicked, the clipping display of interference point P1 is performed. In the clipping display, a display target is divided into two parts with respect to a plane (clipping plane) set in the vicinity of the selected interference point, and one of them is not displayed.

Figure 17:
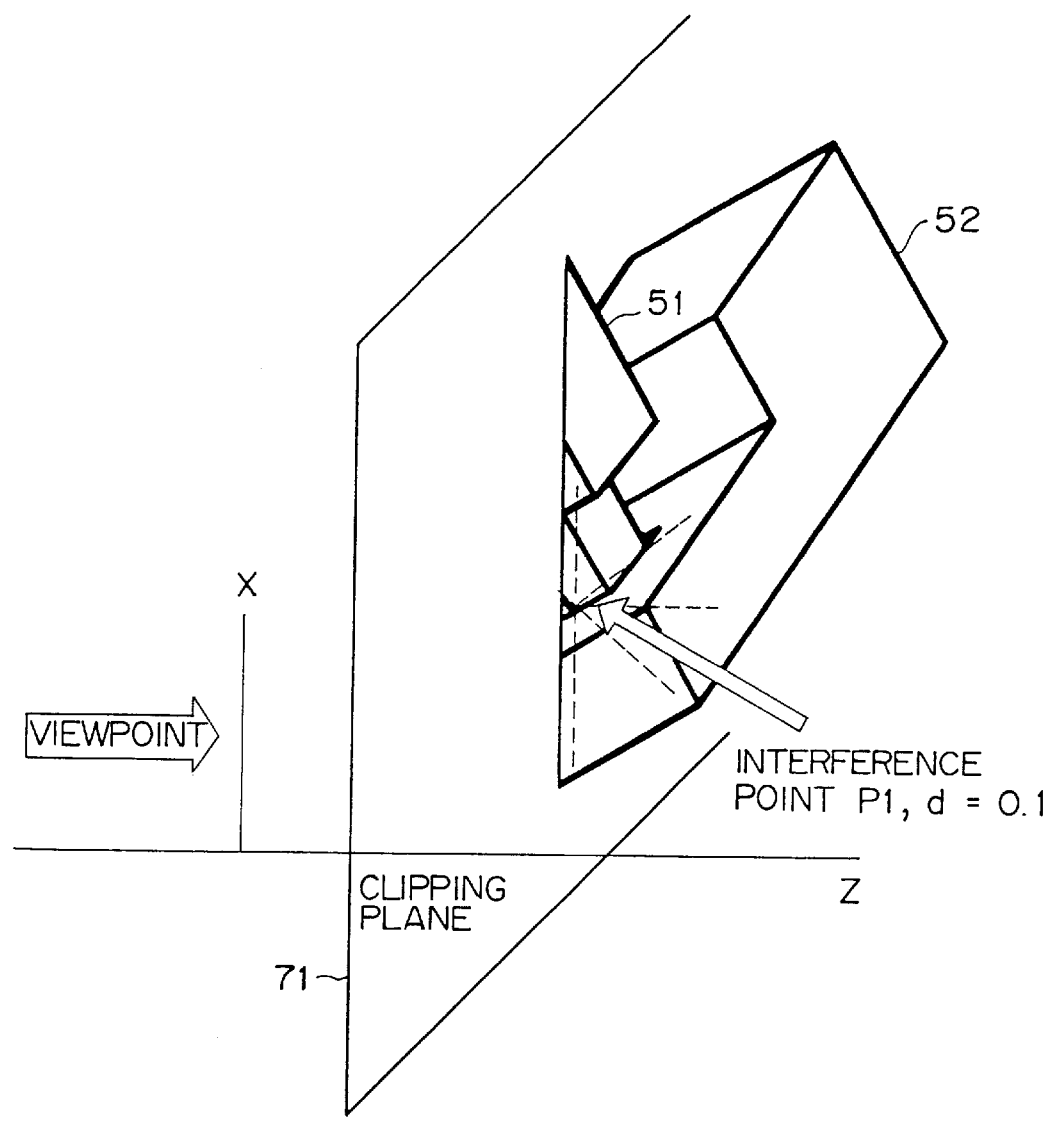
FIG. 17 shows a clipping display.

For example, as shown in FIG. 17, the part in the viewing direction of an assembly model is clipped by a clipping plane 71 which is perpendicular to the Z axis and nearly touches interference point P1, and is not displayed on the screen. Simultaneously with the clipping, the viewpoint is shifted in the direction of the interference point, and the vicinity of the interference point is automatically enlarged and displayed. Thus, even when the interference point is hidden inside an assembly model, the interference point can be clearly observed from the viewing direction.

After the vicinity of the interference point is enlarged like this, for example, when a user selects a displayed component using a pointing device and moves the component interactively, both the multi-to-multi object distance calculator unit 15 and the inter-object interference judgement unit 16 automatically start an one-to-multi interference checking process between the moved component and the other components.

The multi-to-multi object distance calculator unit 15 performs a distance calculation in real time, for example, using an efficient algorithm with a meta-tree. If an obtained distance between components is smaller than a threshold, the inter-object interference judgement unit 16 judges that those components interfere with each other, and if not, it judges that they do not interfere with each other.

The algorithm of interference checking with a meta-tree is disclosed in the Japanese Patent Laid-open 9-27046 described earlier. According to this algorithm, a plurality of objects to be checked are classified into two groups, and a multi-to-multi interference check between the groups is performed. First, a sphere for enveloping each object is generated, and further a new sphere for enveloping the generated spheres is generated. In this way, larger envelope spheres are generated in order, these are hierarchically arranged, and a meta-tree is configured for each group.

Then, a relation between the envelope spheres of one group and those of the other group is checked by way of a depth-first retrieval based on the two meta-trees, and finally a pair of close spheres in the bottom layer is obtained. Then, a distance is calculated applying the method of Gilbert et al. to a pair of objects corresponding to the obtained pair of spheres.

When this algorithm is applied to a one-to-multi interference check, for example, each layer of one meta-tree can be represented by one sphere. When the moved component comprises a plurality of components, a meta-tree corresponding to the components is generated, and a multi-to-multi interference check is automatically performed.

Assuming that a component 51 is picked up and moved in the state shown in FIG. 17, interference checks between the component 51 and the other components are performed. In this case, since there is only a component 52 other than the component 51, an interference check is performed between these two components.

The multi-object static interference judgement unit 13 can also judge at high speed whether the interference is a real interference or just touching by performing a tolerance analysis for interfering pairs listed up in step S6 of FIG. 15. The algorithm of the tolerance analysis is disclosed in prior Japanese Patent Application 9-247324 ("Disassembly Route Generator Apparatus, Assembly Route Generator Apparatus and Mechanical Design Support System").

According to this algorithm, the combinations of interfering polygons are detected from pairs of interfering objects, one polygon is contracted, and the polygon is slightly moved inside the object. Then, an interference check is performed again, and if the objects do not interfere with each other, it is considered that these objects just touch each other. When they still interfere with each other even if one of the polygons moves, it is considered that these objects really interfere with each other.

Figure 18:
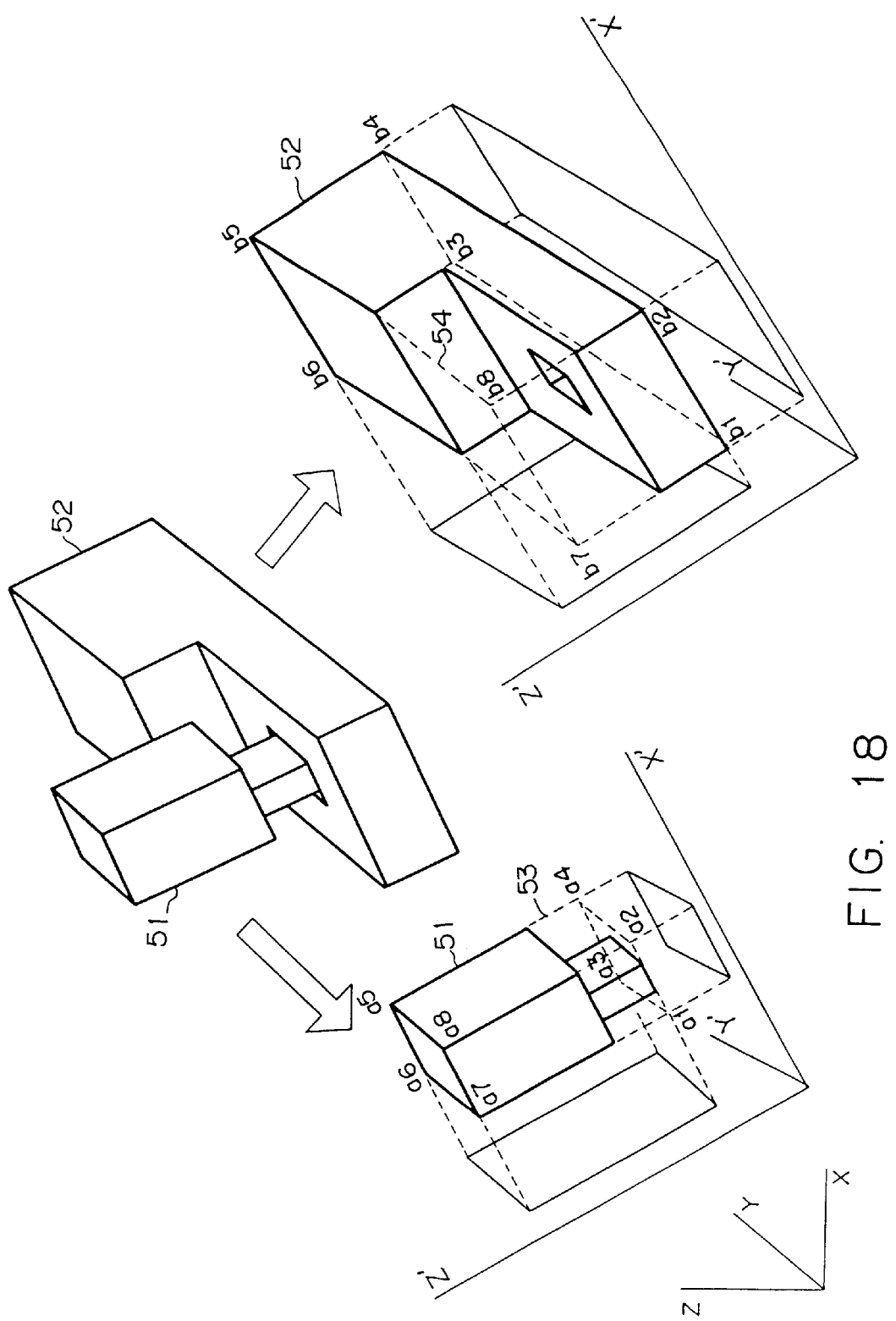
FIG. 18 shows a dynamic determination method of a projection direction.

Although in the coordinate transformations shown in FIGS. 10 and 11, a new rectangular parallelepiped is generated for a component after coordinate transformation, and projection data are calculated using the new rectangular parallelepiped, an original rectangular parallelepiped can also be used as it is by dynamically determining the projecting direction along with the coordinate transformation. For example, as shown in FIG. 18, a new X'Y'z' coordinate system can also be set up using a coordinate axis parallel to each edge of rectangular parallelepipeds 53 and 54 enveloping components 51 and 52, respectively, which are moved in an XYZ coordinate system, and the rectangular parallelepipeds 53 and 54 can be projected on the X', Y' and Z' axes.

Figure 19:
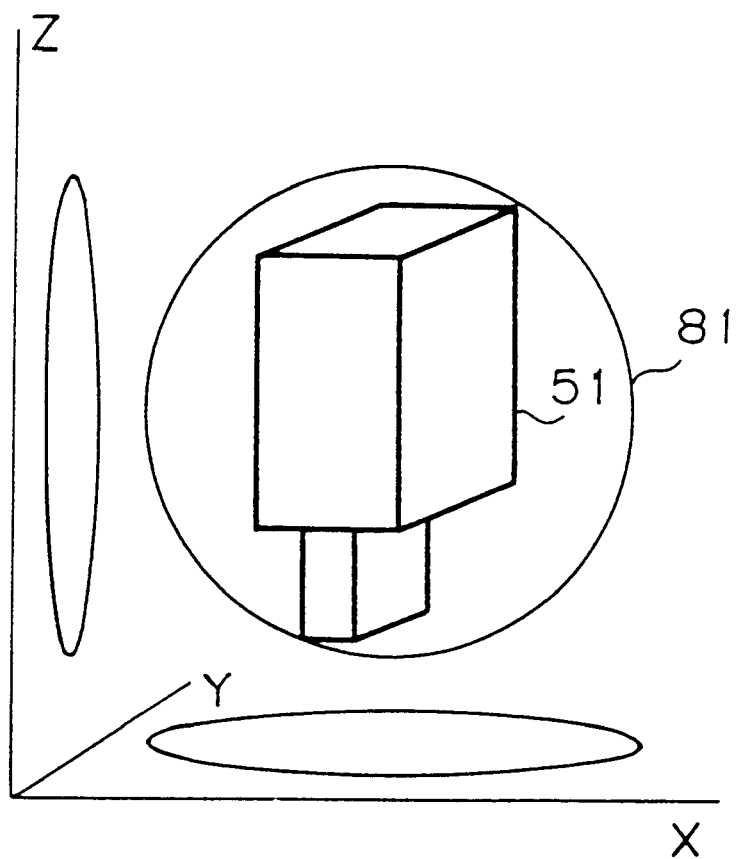
FIG. 19 shows a first sphere.
Figure 20:
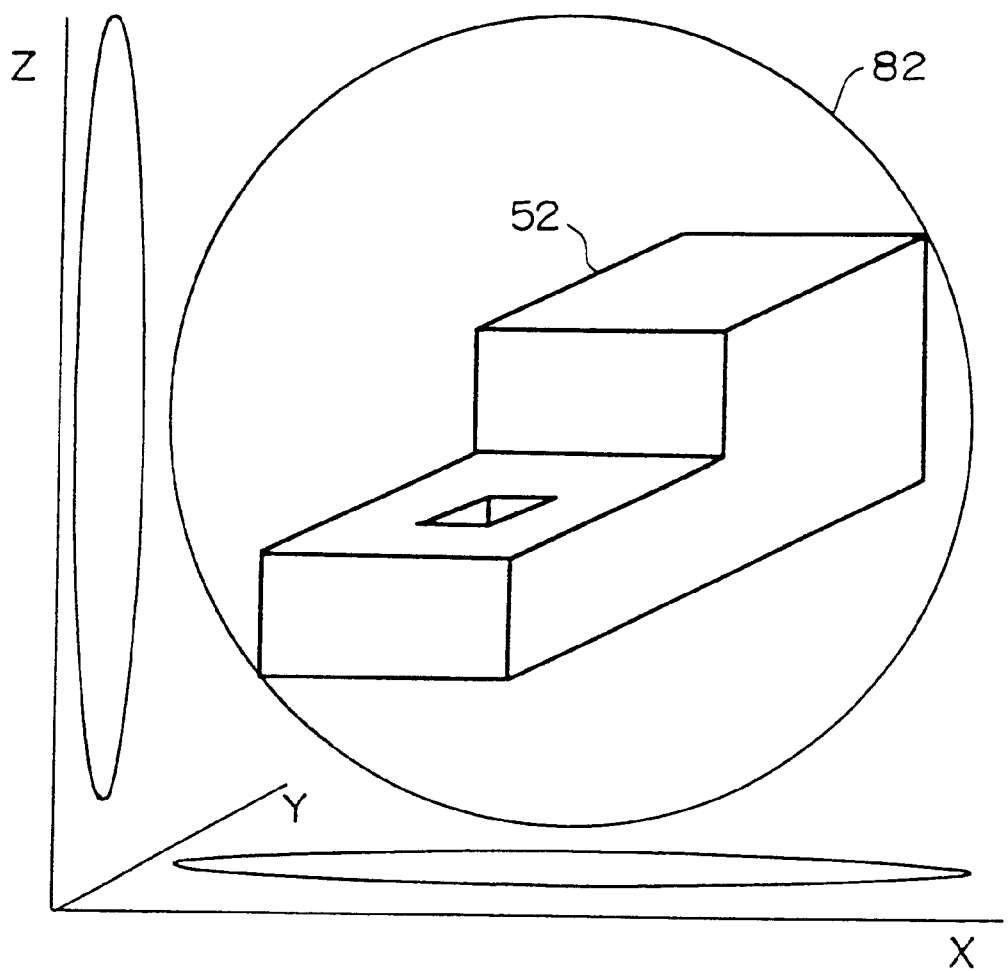
FIG. 20 shows a second sphere.

Although in the preferred embodiments described above, a rectangular parallelepiped is used for a figure for enveloping a component for the purpose of an interference possibility judgement, the same processes can be executed even when another figure is used. For example, in the assembly model shown in FIG. 6, the components 51 and 52 can also be enveloped with spheres 81 and 82, respectively, as shown in FIGS. 19 and 20.

In this case, both the maximum values max{X}, max{Y} and max{Z} and the minimum values min{X}, min{Y} and min{Z} of the X, Y and Z coordinate values, respectively, of all the vertices composing a component are calculated, and both the center position of a sphere and a radius r are calculated as follows.

$$\text{max}=(\text{max}\{X\}, \text{max}\{Y\}, \text{max}\{Z\}),$$

$$\text{min}=(\text{min}\{X\}, \text{min}\{Y\}, \text{min}\{Z\}),$$

center=(max+min)/2.0, r=‖max−min‖/2.0 where ‖max−min‖ indicates a distance between the max and min. When a sphere is used, the radius does not change in the coordinate transformation in step S2 of FIG. 5. So, it is sufficient to update only the position coordinate of the center. Therefore, the amount of calculation is only ⅛ of that in the case where a rectangular parallelepiped with eight vertices is updated.

Figure 21:
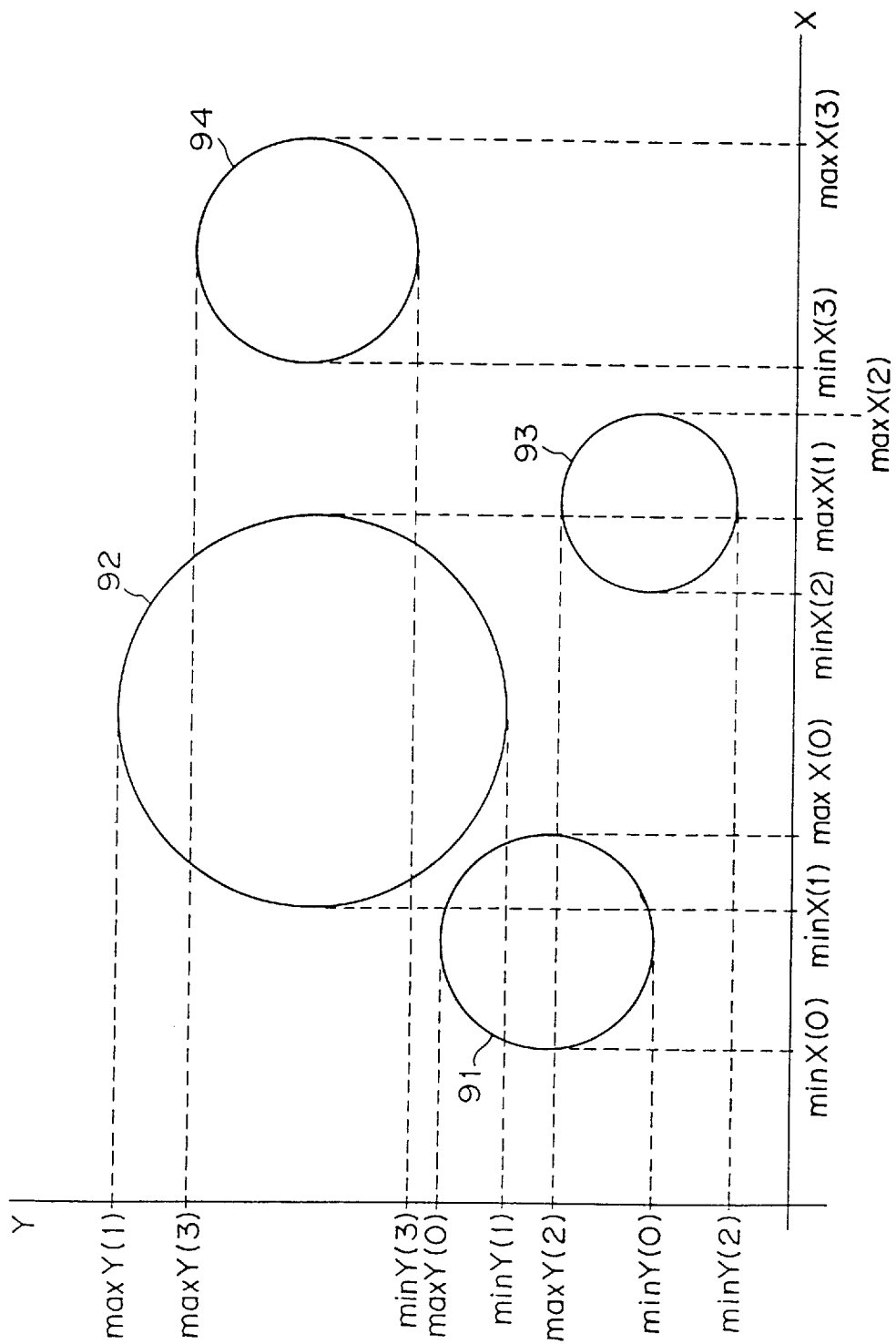
FIG. 21 shows second projection data.

FIG. 21 shows the result obtained when four spheres are projected on an XY plane and further projected on X and Y axes. In FIG. 21, circles 91, 92, 93 and 94 indicate the projections on the XY plane of four spheres enveloping components. Assuming that the suffixes of spheres corresponding to the circles 91, 92, 93 and 94 are i=0, 1, 2 and 3, respectively, projection data on the X and Y axes of these spheres, projX(i) and projY(i) become as follows.

Circle 91 projX(0)=(maxX(0), minX(0)), projY(0)=(maxY(0), minY(0))

Circle 92 projX(1)=(maxX(1), minX(1)), projY(1)=(maxY(1), minY(1))

Circle 93 projX(2)=(maxX(2), minX(2)), projY(2)=(maxY(2), minY(2))

Circle 94 projX(3)=(maxX(3), minX(3)), projY(3)=(maxY(3), minY(3))

Projection data on the Z axis, projZ(i) can be calculated in the same way. When a sphere is used, maxX(i), maxY(i) and maxZ(i) can be easily calculated by adding a radius r to the X, Y and Z coordinate values of the center, respectively. In the same way, minX(i), minY(i) and minZ(i) can be easily calculated by subtracting a radius r from the X, Y and Z coordinate values of the center, respectively.

By using projection data obtained like this, the interference possibility judgement processes shown in FIGS. 15 and 16 can be executed in the same way as in the case of a rectangular parallelepiped. The subsequent precise interference judgement process, the display of interference points, a clipping, the enlarged display of the vicinity of an interference point, an interactive interference check, a tolerance analysis, etc. in the case of a circle are the same as described above.

Although in the preferred embodiments described above, the interference check of an assembly model in a mechanical CAD system is mainly described, the present invention is also applicable to all the fields using a CG model. For example, the present invention can also be applied to planning and off-line teaching with a robot, or virtual reality systems such as games using a high-speed graphics work station/personal computer, animation, walk-through, etc.

When a robot is remotely controlled, it is necessary to avoid unnecessary collision/interference with other objects in the vicinity. When the robot is operated by a program, it is necessary to perform a path planning in advance in such a way that such collision/interference may not occur. In such a case, the interference check of the present invention can be used.

In a virtual reality system, it is necessary to properly control interference with other objects in such a way that a displayed object may not take unnatural actions, such as passing through a wall, etc. In such a case, the interference check of the present invention can be used.

According to the present invention, the interference state of many objects generated on a computer can be judged at high speed, and the position where those objects interfere with each other can be displayed. The distance between an object and another object in the vicinity of the object can also be calculated by checking the interference state in real time while selecting and moving one of interfering objects.

What is claimed is:

1. An interference checking apparatus for checking an interference state of a plurality of objects generated on a computer, comprising:
    a storing unit storing object data representing the plurality of objects;
    a projecting unit generating one-dimensional projection data representing each of the plurality of objects using the object data, the projection data representing a segment for each object on a coordinate axis in a coordinate system;
    an extracting unit extracting a pair of objects with a possibility of interference from the plurality of objects by comparing the projection data of the plurality of objects;
    a judging unit checking an interference between the extracted pair of the objects; and
    an outputting unit outputting a result of an interference check.

2. The interference checking apparatus according to claim 1, wherein said extracting unit includes a sorting unit sorting the projection data of the plurality of objects, and extracts the pair of objects, with a possibility of interference by checking an overlapping state of projection data based on a sorting result of the projection data.

3. The interference checking apparatus according to claim 2, wherein
    said projecting unit projects the plurality of objects on at least two coordinate axes and calculates the projection data; and
    said extracting unit, after checking the overlapping state of the projection: data in a sorting direction, checks the overlapping state of the projection data in another direction.

4. The interference checking apparatus according to claim 1, wherein said projecting unit includes an approximating unit generating an envelope figure enveloping each of the plurality of objects, and generates projection data corresponding to the envelope figure.

5. The interference checking apparatus according to claim 4, wherein said approximating unit uses one of a rectangular parallelepiped and a sphere for the envelope figure.

6. The interference checking apparatus according to claim 4, further comprising:
    a transforming unit performing a coordinate transformation, of the envelope figure, wherein said projecting unit generates the projection data from the envelope figure after the coordinate transformation.

7. The interference checking apparatus according to claim 1, wherein said judging unit includes
    a distance calculating unit calculating a distance between two objects in the pair of objects, and judges whether or not the two objects interfere with each other by performing a threshold judgment for the obtained distance.

8. An interference checking apparatus checking an interference state of a plurality of objects generated on a computer, comprising:

a storing unit storing object data representing the plurality of objects;

a projecting unit generating one-dimensional projection data representing each of the plurality of objects using the object data;

an extracting unit extracting a pair of objects with a possibility of interference from the plurality of objects using the projection data;

a judging unit checking an interference between the extracted pair of the :objects;

an outputting unit outputting a result of an interference check;

a selecting unit, when said outputting unit displays a plurality of pairs of interfering objects selecting one of the pairs of interfering objects; and a displaying unit dividing a display target with a plane in a vicinity of an interference position of the selected pair, into two parts, allowing one of the two parts not to be displayed and displaying an enlarged vicinity of the interference position.

9. The interference checking apparatus according to claim 1, further comprising:

a selecting unit, when said outputting unit displays a pair of interfering objects, selecting one of the interfering objects; and an interactive interference checking unit interactively checking interferences while moving the selected object.

10. An interactive checking apparatus for checking an interference state of a plurality of objects generated on a computer, comprising:

a storing unit storing both position information of vertices composing each of the plurality of objects and parental relation between an object and another object;

an updating unit, when an object moves, updating the position information of the vertices of the moved object, in case of necessity;

a first judging unit performing a combinational interference check among the plurality of objects at one time based on the updated position information on the vertices;

a displaying unit graphically displaying an interference position where interference is judged to occur;

a calculating unit calculating the shortest distance between at least one object in a vicinity of the interferences position when a user selects the at least one object in the vicinity of the interference position displayed graphically and other objects; and a second judging unit checking interference between the at least one object and the other objects by performing a threshold judgment for the obtained distance.

11. An interference checking apparatus for checking an interference state of at least three objects generated on a computer, comprising:

a first interference checking unit projecting object data representing each of the at least three objects into a lower dimensional space, generating projection data for each object, the projection data representing a scope of a space in which each object exists with coordinate values in the lower dimensional space, and extracting a pair of objects with a possibility of interference from the at least three objects by comparing the projection data of the at least three objects; and a second interference checking unit checking an interference between the extracted pair of objects.

12. The interference checking apparatus according to claim 11, wherein said first interference checking unit is faster in operation speed than said second interference checking unit and performs an interference check for all combinations among the at least three objects, and said second interferences unit is higher in operation accuracy than said first interference checking unit and performs an interference check for all combinations judged to interfere with each other by said first interference unit.

13. The interference checking apparatus according to claim 11, wherein said first interference checking unit includes:

a projecting unit projecting object data representing each of the at least three objects into a lower dimensional space; and an extracting unit extracting the pair of objects with a possibility of interference from the at least three objects using projection data, and said second interference checking unit includes a judging unit checking the interference between the extracted pair of objects.

14. The interference checking apparatus according to claim 13, further comprising:

a storing unit storing the object data projected by said projecting unit; and an outputting unit outputting a result of an interference check by said judging unit.

15. A computer-readable recording medium on which is recorded a program for causing a computer to generate a plurality of object models and'to check an interference state of the plurality of object models, said program comprising:

generating one-dimensional projection data representing each of the plurality of objects using object data representing the plurality of objects, the projection data representing a segment for each object on a coordinate axis in a coordinate system;

extracting a pair of objects with a possibility of interference from the plurality of objects by comparing the projection data of the plurality of objects; and checking interference between the extracted pair of objects.

16. A computer-readable recording medium on which is recorded a program for causing a computer to generate at least three object models and to check an interference state of the plurality of object models, said program comprising:

projecting object data representing each of the at least three objects into a lower dimensional space, generating projection data for each object, the projection data representing a scope of a space in which each object exists with coordinate values in the lower dimensional space;

extracting a pair of objects with a possibility of interference from the at least three objects by comparing the projection data of the at least three objects; and checking an interferences between the extracted pair of objects.

17. An interference checking method of checking an interference state of a plurality of objects generated on a computer, comprising:

generating one-dimensional projection data representing each of the plurality of objects using object data representing the plurality of objects, the projection data representing a segment for each object on a coordinate axis in a coordinate system;

extracting a pair of objects with a possibility of interference from the plurality of objects by comparing the projection data of the plurality of objects; and checking an interference between the extracted pair of objects.

18. An interference checking method of checking an interference state of at least three objects generated on a computer, comprising:

projecting object data representing each of the at least three objects into a lower dimensional space, generating projection data for each object, the projection data representing a scope of a space in which each object exists with coordinate values in the lower dimensional space;

extracting a pair of objects with a possibility of interference from the at least three objects by comparing the projection data of the at least three objects; and checking an interferences between the extracted pair of objects.

* * * * *